US009467918B1

(12) United States Patent
Kwan

(10) Patent No.: US 9,467,918 B1
(45) Date of Patent: Oct. 11, 2016

(54) SYSTEM AND METHOD TO FACILITATE RADIO ACCESS POINT LOAD PREDICTION IN A NETWORK ENVIRONMENT

(71) Applicant: CISCO TECHNOLOGY, INC., San Jose, CA (US)

(72) Inventor: Raymond Yuk Chor Kwan, Swingdon (GB)

(73) Assignee: CISCO TECHNOLOGY, INC., San Jose, CA (US)

( * ) Notice: Subject to any disclaimer, the term of this patent is extended or adjusted under 35 U.S.C. 154(b) by 0 days.

(21) Appl. No.: 14/833,791

(22) Filed: Aug. 24, 2015

Related U.S. Application Data

(63) Continuation of application No. 14/808,821, filed on Jul. 24, 2015.

(51) Int. Cl.
*H04W 36/00* (2009.01)
*H04W 36/24* (2009.01)
*H04W 52/02* (2009.01)
*H04W 36/22* (2009.01)
*H04W 84/02* (2009.01)
*H04W 88/12* (2009.01)

(52) U.S. Cl.
CPC ........... *H04W 36/245* (2013.01); *H04W 36/22* (2013.01); *H04W 52/0206* (2013.01); *H04W 84/02* (2013.01); *H04W 88/12* (2013.01)

(58) Field of Classification Search
CPC ... H04W 28/08; H04W 28/16; H04W 24/00; H04W 16/06; H04W 36/30; H04W 36/18; H04W 36/08; H04W 36/14; H04W 36/12; H04W 36/22; H04W 36/0055
USPC ......................................... 455/436, 438, 453
See application file for complete search history.

(56) References Cited

U.S. PATENT DOCUMENTS

| 5,687,171 A | 11/1997 | Shin et al. |
| 5,790,534 A | 8/1998 | Kokko et al. |
| 6,005,852 A | 12/1999 | Kokko et al. |
| 7,099,674 B2 | 8/2006 | Diao et al. |
| 2012/0314607 A1 | 12/2012 | Craig et al. |
| 2013/0294272 A1 | 11/2013 | Xiao et al. |

(Continued)

OTHER PUBLICATIONS

"3GPP Long-Term Evolution (LTE): Quality of Service (QoS) in LTE," posted by Adnan Basir on Jan. 31, 2013; 5 pages http://4g-lte-world.blogspot.com/2013/01/quality-of-service-qos-in-lte.html.

(Continued)

*Primary Examiner* — Temica M Beamer
(74) *Attorney, Agent, or Firm* — Patent Capital Group

(57) ABSTRACT

A method is provided in one example embodiment and may include training a statistical model representing radio access point loads or load changes for radio access points, wherein the statistical model is trained using, at least in part, historical measurement data associated with previous user equipment (UE) handovers among the radio access points and wherein the historical measurement data used to train the statistical model is gathered before and after the previous UE handovers; collecting current measurement data associated with a source radio access point and a target radio access point; and calculating a predicted load or load change for the target radio access point for one or more potential UE handovers from the source radio access point to the target radio access point for one or more UE based, at least in part, on application of the current measurement data to the trained statistical model.

20 Claims, 7 Drawing Sheets

(56) References Cited

U.S. PATENT DOCUMENTS

| | | |
|---|---|---|
| 2014/0112172 A1 | 4/2014 | Vangala et al. |
| 2015/0098387 A1 | 4/2015 | Garg et al. |
| 2015/0126193 A1* | 5/2015 | Huang .............. H04W 36/0083 455/436 |

OTHER PUBLICATIONS

"5G," from Wikipedia, the free encyclopedia, Jul. 2, 2015; 11 pages.
"Big data," from Wikipedia, the free encyclopedia, Jul. 7, 2015; 21 pages.
"Broadband Forum Technical Report: TR-069 CPE WAN Management Protocol," Issue: 1 Amendment 5, CWMP Version: 1.4; Issue Date: Nov. 2013; 228 pages.
"Broadband Forum Technical Report: TR-196 Femto Access Point Service Data Model," Issue: 2; Issue Date: Nov. 2011; 46 pages.
"ETSI TR 136 902 V9.3.1 (May 2011)Technical Report: LTE; Evolved Universal Terrestrial Radio Access Network (E-UTRAN); Self-configuring and self-optimizing network (SON) use cases and solutions (3GPP TR 36.902 version 9.3.1 Release 9)," ETSI, 650 Route des Lucioles F-06921 Sophia Antipolis Cedex—FRANCE, May 2011; 23 pages.
"ETSI TS 136 214 V10.1.0 (Apr. 2011)Technical Specification: LTE; Evolved Universal Terrestrial Radio Access (E-UTRA); Physical layer; Measurements (3GPP TS 36.214 version 10.1.0 Release 10)," ETSI, 650 Route des Lucioles F-06921 Sophia Antipolis Cedex—France, Apr. 2011; 15 pages.
"Multiple Regression Analysis," Explorable.com, Jun. 18, 2009; https://explorable.com/multiple-regression-analysis.
"QoS management in LTE: what is the difference between QCI and ARP priority?" Tag Archives: ARP (Allocation and retention priority), 4G University, posted on Oct. 5, 2012 by IS-Wireless; 2 pages http://4g-university.com/tag/arp-allocation-and-retention-priority.
"Regression analysis," from Wikipedia, the free encyclopedia, Jul. 1, 2015; 13 pages.
"Why take transpose of regressor variable in linear regression?" Cross-Validated, Jan. 2015; 3 pages http://stats.stackexchange.com/questions/130983/why-take-transpose-of-regressor-variable-in-linear-regression.
FP7 ICT-Socrates, "Load Balancing in Downlink LTE Self-Optimizing Networks," TD (10)10071, COST 2100, 10thMCM, Feb. 3-5, 2010, Athens Greece; 25 pages.
Hastie, Trevor, et al., *The Elements of Statistical Learning: Data Mining, Inference, and Prediction, Second Edition (Springer Series in Statistics)*, Springer; 2nd ed. 2009. Corr. 7th printing 2013 edition (Dec. 23, 2011) 764 pages.
Johnson, Chris, *Long Term Evolution in Bullets*, 2nd Edition, CreateSpace Independent Publishing Platform; 2 edition (Jul. 6, 2012); Abstract Only.
Kwan, Raymond, et al., "On Downlink Load Estimation for LTE in the Context of Self-Organizing Networks," 2013 20th International Conference on Telecommunications (ICT), Casablanca, May 6-8, 2013; 5 pages.
Kwan, Raymond, et al., "On Mobility Load Balancing for LTE Systems," Vehicular Technology Conference Fall (VTC 2010-Fall), Sep. 2010; 5 pages.
Kwan, Raymond, et al., "On Pre-emption and Congestion Control for LTE Systems," Vehicular Technology Conference Fall (VTC 2010-Fall), Ottawa, ON, Sep. Jun. 9, 2010; 5 pages.
Kwan, Raymond, et al., "On Radio Admission Control for LTE Systems," Vehicular Technology Conference Fall (VTC 2010-Fall), Ottawa, ON, Sep. 6-9, 2010; 5 pages.
Lobinger, Andreas, et al., "Load Balancing in Downlink LTE Self-Optimizing Networks," Vehicular Technology Conference (VTC 2010-Spring), Taipei, Taiwan, May 16-19, 2010; 5 pages.
*LTE Self-organizing Networks (SON): Network Management Automation for Operational Efficiency*, Seppo Hämäläinen (Editor), Henning Sanneck (Editor), Cinzia Sartori (Editor); Wiley-Blackwell; 1 edition (Jan. 2012); Abstract Only.
Samdanis, Konstantinos, et al., "Self-Organized Energy Efficient Cellular Networks," 21st Annual IEEE International Symposium on Personal, Indoor, and Mobile Radio Communications, Sep. 2010; 6 pages.
USPTO Mar. 28, 2016 Non-Final Office Action from U.S. Appl. No. 14/808,821.

* cited by examiner

SYSTEM AND METHOD TO FACILITATE RADIO ACCESS POINT LOAD PREDICTION IN A NETWORK ENVIRONMENT

RELATED APPLICATION

This Application is a continuation (and claims the benefit of priority under 35 U.S.C. §120) of U.S. application Ser. No. 14/808,821, filed Jul. 24, 2015, entitled "SYSTEM AND METHOD TO FACILITATE RADIO ACCESS POINT LOAD PREDICTION IN A NETWORK ENVIRONMENT," Inventor Raymond Yuk Chor Kwan. The disclosure of the prior application is considered part of (and is incorporated in its entirety by reference in) the disclosure of this application.

TECHNICAL FIELD

This disclosure relates in general to the field of communications and, more particularly, to a system and method to facilitate radio access point load prediction in a network environment.

BACKGROUND

Networking architectures have grown increasingly complex in communications environments, particularly mobile wireless environments. Mobile communication networks have grown substantially in subscriber base as end users become increasingly connected to mobile wireless environments. As the number of mobile subscribers and the data demands of mobile subscribers increases, efficient management of communication resources becomes more critical. In particular, network operators and service providers desire to provide subscribers with the ability to be mobile throughout a communication network among different macro cell networks, small cell networks, Wireless Fidelity (WiFi) networks, etc. in a seamless manner such that subscriber experience is minimally impacted. However, as the number of mobile subscribers and the data demands of mobile subscribers continue to increase, there are significant challenges in managing network resources to optimize subscriber loading within the communication network among resources available in the network.

BRIEF DESCRIPTION OF THE DRAWINGS

To provide a more complete understanding of the present disclosure and features and advantages thereof, reference is made to the following description, taken in conjunction with the accompanying figures, wherein like reference numerals represent like parts, in which.

DETAILED DESCRIPTION OF EXAMPLE EMBODIMENTS

Overview

Figure 1:
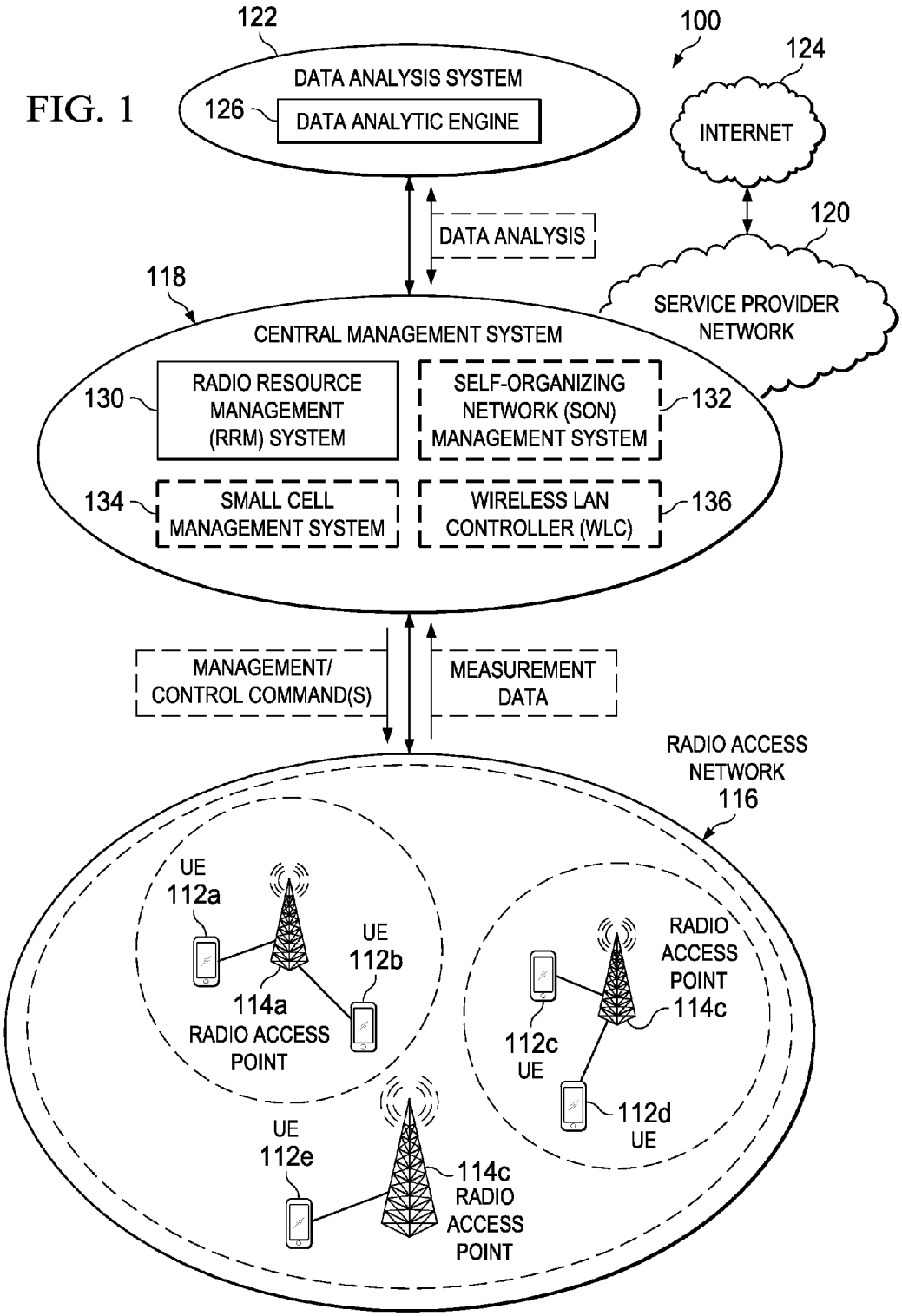
FIG. 1 is a simplified block diagram illustrating a communication system to facilitate radio access point load prediction in a network environment according to one embodiment of the present disclosure.

A method is provided in one example embodiment and may include training a statistical model representing radio access point loads or load changes for a plurality of radio access points, wherein the statistical model is trained using, at least in part, historical measurement data associated with a plurality of previous user equipment (UE) handovers among the plurality of radio access points and wherein the historical measurement data used to train the statistical model is gathered before and after the plurality of previous UE handovers; collecting current measurement data associated with a source radio access point and a target radio access point; and calculating a predicted load or load change for the target radio access point for one or more potential UE handovers from the source radio access point to the target radio access point for one or more UE based, at least in part, on application of the current measurement data to the trained statistical model.

In some cases, the statistical model can be associated with a load function representing load or load changes for the plurality of radio access points. In some cases, the training is performed to train the statistical model to converge towards an error criterion. In some instances the error criterion can be a mean square error criterion.

In some cases, the historical measurement data and the current measurement data can include one or more of: channel quality information associated with the source radio access point and the target radio access point; guaranteed bit rate (GBR) information associated with one or more UE; maximum bit rate information associated with one or more UE; Quality of Service (QoS) Class Identifier information associated with one or more UE; Allocation and Retention Priority information associated with one or more UE; Access Point Name (APN) Aggregate Maximum Bit Rate (A-AMBR) information associated with one or more APNs; and UE Aggregate Maximum Bit Rate (UE-AMBR) information associated with one or more UE. In some instances, the channel quality information can be associated with one or more measurements performed by one or more UE connected to the source radio access point.

In other cases, the method can include determining whether to initiate handover to the target radio access point for one or more UE associated with the source radio access point based, at least in part, on the predicted load or load change calculated for the target radio access point. In some instances, the determining can be performed using a central management system, which comprises one or more of: a radio resource management system; a self-organizing network management system; a small cell management system; and a wireless local area network (WLAN) controller. In some instances, the source radio access point or the target radio access point can be one or more of: a 3rd Generation Partnership Program (3GPP) macro cell radio; a 3GPP small cell radio; and a WiFi radio access point.

Another method is provided in one example embodiment and may include training a statistical model representing a network behavior for a radio access network comprising a plurality of radio access points, wherein the statistical model is trained using historical measurement data gathered from the radio access network that is associated with a plurality of previous UE handovers among the plurality of radio access points and wherein the historical measurement data used to train the statistical model is gathered before and after the plurality of previous UE handovers; collecting current measurement data associated with a source radio access point and a target radio access point; and calculating a predicted network behavior for the radio access network for one or more potential UE handovers from the source radio access point to the target radio access point for one or more UE based, at least in part, on application of the current measurement data to the trained statistical model. In some cases, the statistical model can be associated with a particular function representing the network behavior for the plurality of radio access points.

In some cases, the method can include storing successive collections of current measurement data; and updating the statistical model based, at least in part, on successive collections of current measurement data. In some instances, the updating can be based additionally on measurement data collected for the source radio access point and the target radio access point after the one or more UE are handed over to the target radio access point.

In various instances, the network behavior can be associated with one or more of: an increased load for one or more radio access points for one or more UE handovers; a decreased load for one or more radio access points for one or more UE handovers; a change in load for one or more radio access points for one or more UE handovers; a change in congestion for the radio access network for one or more UE handovers; and a change in energy consumption for the radio access network for one or more UE handovers.

Another method is provided in one example embodiment and may include calculating predicted load changes for a target radio access point for one or more potential user equipment (UE) handovers from each of a plurality of source radio access points for a radio access network based, at least in part, on application of current measurement data to a trained statistical model representing load changes for the radio access network; solving an optimization problem associated with energy savings for the radio access network to determine a set of one or more source radio access points that can be powered off to maximize energy savings or minimize energy consumption for the radio access; initiating handover to the target radio access point for one or more UE connected to the one or more source radio access points belonging to the set; and powering off the one or more source radio access points belonging to the set. In various instances, the statistical model can be associated with a load function representing load or load changes for the plurality of radio access points.

In some cases, the method can include ranking each predicted load change for the target radio access point for the one or more potential UE handovers calculated for each of the plurality of source radio access points according to a predetermined order. In various instances, the predetermined order of the ranking can represent one of: a range of predicted load changes from a smallest contribution of predicted load change for the target radio access point to a largest predicted load change for the target radio access point; and a range of energy consumption for the plurality of source radio access points for the predicted load changes in a descending order from a largest contribution to energy consumption within the radio access network for a given source radio access point to a smallest contribution to energy consumption within the radio access network. In various instances, each of the plurality of source radio access points provides a corresponding coverage area that is contained within a coverage area of the target radio access point.

Example Embodiments

Referring to FIG. 1, FIG. 1 is a simplified block diagram illustrating a communication system 100 to facilitate radio access point load prediction in a network environment according to one embodiment of the present disclosure. In some embodiments, this particular configuration may be tied to 3rd Generation Partnership Project (3GPP) based architectures, including, but not limited to: an Evolved Packet System (EPS) architecture, also sometimes referred to as the Long Term Evolution (LTE) EPS architecture; a Circuit Switched (CS) architecture; a Packet Switched (PS) architecture; combinations thereof or the like. In some embodiments, this particular configuration may be tied to a non-3GPP architectures including, but not limited to: a WiFi architecture; a Worldwide Interoperability for Microwave Access (WiMAX) architecture; a Z-Wave® architecture, a ZigBee® architecture; a Bluetooth™ architecture; a Machine-to-Machine (M2M) architecture; combinations thereof or the like. In still some embodiments, the configuration may be tied to a combination of 3GPP-based and non-3GPP based architectures. Alternatively, the depicted configuration may be applicable to other environments equally.

The example architecture of FIG. 1 can include users operating user equipment (UE) 112a-112e, radio access points 114a-114c, a radio access network (RAN) 116, a central management system 118, a service provider network 120, a data analysis system 122 and an internet 124. Central management system can include a Radio Resource Management (RRM) system. Data analysis system 122 can include a data analytic engine 126. In various embodiments, central management system 118 can further include a Self-Organizing Network (SON) management system 132, a small cell management system 134 and/or a wireless local area network (LAN) controller (WLC) 136. Each radio access point 114a-114c can be logically connected to central management system 118 and service provider network 120.

Each radio access point 114a-114c can be associated with a corresponding radio coverage area, as indicated by the respective dashed-line circle surrounding each respective radio access point 114a-114c. In some embodiments, radio coverage areas for one or more radio access points can overlap, in whole or in part, radio coverage areas for one or more other radio access points (e.g., the radio coverage area for radio access point 114c can include the radio coverage areas for radio access points 114a and 114b). It should be understood that the coverage areas shown in FIG. 1 are provided for illustrative purposes only, and are not meant to limit the broad scope of the teachings of the present disclosure. Any other coverage areas (e.g., coverage area size/range) can be provided by radio access points within the scope of the present disclosure.

In various embodiments, UE 112a-112e can be associated with users, employees, clients, customers, etc. wishing to initiate a flow in communication system 100 via some network. The terms 'user equipment', 'mobile node', 'end user', 'user', and 'subscriber' are inclusive of devices used to initiate a communication, such as a computer, a personal digital assistant (PDA), a laptop or electronic notebook, a cellular telephone, an i-Phone™, iPad™, a Google Droid™ phone, an IP phone, or any other device, component, element, or object capable of initiating voice, audio, video, media, or data exchanges within communication system 100. UE 112a-112e may also be inclusive of a suitable interface to a human user such as a microphone, a display, a keyboard, or other terminal equipment.

UE 112a-112e may also be any device that seeks to initiate a communication on behalf of another entity or element such as a program, a database, or any other component, device, element, or object capable of initiating an exchange within communication system 100. For example, UE 112a-112e may be inclusive of machine-to-machine (M2M) type communication capable devices such as, for example, parking meters, vending machines, traffic signals, crossing signals, appliances, heating and cooling systems, utility management systems, combinations thereof or the like. Data, as used herein in this document, refers to any type of numeric, voice, video, media, or script data, or any type of source or object code, or any other suitable information in any appropriate format that may be communicated from one point to another. In some embodiments, UE 112a-112e may have a bundled subscription for network access and application services (e.g., voice), etc. Once the access session is established, the user can register for application services as well, without additional authentication requirements. UE IP addresses can be assigned using dynamic host configuration protocol (DHCP), Stateless Address Autoconfiguration, default bearer activation, etc., or any suitable variation thereof. In various embodiments, each UE 112a-112e can include one or more transmitters and/or receivers (e.g., transceivers) and one or more antenna(s) to facilitate over-the-air (OTA) communications with one or more radio access points 114a-114c.

In various embodiments, interfaces and/or a series of interfaces can be provided in communication system 100 (e.g., for elements of communication system 100), which can offer interoperation for mobility, policy control, power control, load control, interference mitigation or other operations between various elements of communication system 100. For example, interfaces can be used to exchange point of attachment, location, and/or access data for one or more end users, for example, users operating UE 112a-112e. In various embodiments, resource information, accounting information, location information, access network information, network address translation (NAT) control, etc. can be exchanged using a remote authentication dial in user service (RADIUS) protocol or any other suitable protocol where appropriate. Other protocols that can be used in communication system 100 can include DIAMETER protocol, service gateway interface (SGi), terminal access controller access-control system (TACACS), TACACS+, etc. to facilitate communications. In some embodiments, radio access points (e.g., 3GPP based 4G/LTE radio access points) may logically be connected to each other via an X2 interface (not shown in FIG. 1), as defined in 3GPP standards.

RAN 116 is a communications interface between UE (e.g., 112a-112e) and service provider network 120 and/or internet 124 via radio access points 114a-114c. RAN 116 may include one or more radio coverage areas via radio access points 114a-114c for servicing multiple end users and for managing their associated connectivity. The communications interface provided by RAN 116 may allow data to be exchanged between an end user and any number of selected elements within communication system 100. For example, RAN 116 may facilitate the delivery of a request packet (e.g., request for service(s)) generated by a given UE (e.g., UE 112a) and the reception of information sought by an end user.

In various embodiments, RAN 116 may include 3GPP-based access networks such as, for example, Global System for Mobile Communications (GSM) Enhanced Data Rates for GSM Evolution (EDGE) Radio Access Network (GERAN), generally referred to as 2G; Universal Mobile Telecommunications System (UMTS) Terrestrial Radio Access Network (UTRAN), generally referred to as 3G; evolved UTRAN (E-UTRAN), generally referred to as 4G, Long Term Evolution (LTE) and/or LTE-Advanced (LTE-A); and/or any next generation access network, such as, for example 5G. In various embodiments, RAN 116 may include non-3GPP-based access networks such as digital subscriber line (DSL), Cable, wireless local area network (WLAN) (e.g., Wireless Fidelity (WiFi), Worldwide Interoperability for Microwave Access (WiMAX)) and/or the Internet. RAN 116 is only one example of a communications interface between an end user and service provider network 120 and/or internet 124. Other suitable types of communications interfaces may be used for any appropriate network design and, further, be based on specific communications architectures in accordance with particular needs.

In general, service provider network 120 represents a series of points or nodes of interconnected communication paths for receiving and transmitting packets of information that may propagate through communication system 100. In various embodiments, service provider network 120 can be configured according to 3GPP standards to include one or more elements of an Evolved Packet Core (EPC), a packet-switched (PS) architecture and/or a circuit-switched (CS) architecture as prescribed by 3GPP standards in order to provide services (e.g., voice, data, multimedia, etc.) and interconnectivity to UE 112a-112e to one or more packet data networks (e.g., internet 124). In various embodiments, internet 124 can represent a packet data network (PDN) including a series of points or nodes of interconnected communication paths (wired or wireless) for receiving and transmitting packets of information that propagate through communication system 100.

In various embodiments, service provider network 120 may offer communicative interfaces between UE 112a-112e and selected nodes or elements in the network, and may be any local area network (LAN), wireless local area network (WLAN), metropolitan area network (MAN), wide area network (WAN), virtual private network (VPN), Intranet, extranet, or any other appropriate architecture or system that facilitates communications in a network environment. In various embodiments, communication system 100 may implement a user datagram protocol (UDP)/Internet protocol (UDP/IP) connection and use a transmission control protocol (TCP/IP) communication language protocol in particular embodiments of the present disclosure. However, any other suitable communication protocol for transmitting and receiving data packets within communication system 100 may be alternatively implemented.

In some embodiments, any of radio access points 114a-114c can be deployed as a macro cell radio such as, for example, an evolved Node B (eNodeB or eNB), which can provide cellular/mobile coverage for a 4G/LTE macro cell network, or a Node B (NodeB), which can provide cellular/mobile coverage for a 2G/3G macro cell network. In general, a NodeB is deployed in conjunction with a Radio Network Controller (RNC), which may provide radio control for the NodeB. In various embodiments, a given macro cell radio (e.g., any of 114a-114c) can be responsible for selecting a Mobility Management Entity (MME) or a serving General Packet Radio Service (GPRS) support node (SGSN) within service provider network 120 for session establishment for each UE served by the given macro cell radio, for managing radio resources for such UE, and making handover (HO) decisions for such UE, for example, handover (HO) to other radio access points (e.g., eNodeBs, HeNBs, and/or HNBs). In some embodiments, the handover (HO) decisions can be made in combination with control commands generated by central management system 118 (e.g., from RRM system 130 and/or SON management system 132)

In various embodiments, any of radio access points 114a-114c can be deployed as a small cell radio such as, for example, a home evolved NodeB (HeNB), which can provide cellular/mobile coverage for a 4G/LTE small cell network, and/or can be deployed has a Home Node B (HNB), which can provide cellular/mobile coverage for a 2G/3G small cell network. In some embodiments, a given small cell radio can be deployed as 'single-stack' devices offering 4G/LTE or 2G/3G connectivity, 'dual-stack' devices offering 4G/LTE or 2G/3G connectivity and WiFi/WiMAX connectivity, or 'triple-stack' offering 4G/LTE connectivity, 2G/3G connectivity and WiFi/WiMAX connectivity.

Typically, small cell radios operate at lower power levels as compared to macro cell radios to provide services to proximate users, for example, within in a business or residential environment (e.g., within a building, home, etc.). In some embodiments, small cell radios can be deployed in business (e.g., enterprise) environments within predefined clusters, grids or groups that can be optimized to provide contiguous or overlapping cellular/mobile coverage for enterprise users (e.g., employees, visitors, etc.) when such users are located within a coverage area of small cell radios deployed in such a cluster/grid. In some embodiments, small cell radios can be deployed in residential or densely populate environments to provide cellular/wireless connectivity in areas where macro cell radio coverage area(s) may be limited and/or overloaded.

In some embodiments, small cell radios can interface with service provider network 120 via one or more small cell gateways (not shown), which can be used to aggregate and/or manage sessions for UE connected to the small cell network. Small cell radios can be connected using a standard broadband digital subscriber line (DSL), internet or cable service into service provider network 120 via the one or more small cell gateways. Calls can be made and received, where the signals are sent (potentially encrypted) from a given small cell radio via the broadband Internet protocol (IP) network to one of the service provider's main switching centers. Small cell radios can also interface with small cell management system 134, which can be used to manage configurations for the small cell radios according to a particular communications protocol (e.g., technical report (TR) 069) and data model (e.g., TR-196 version 2). In some embodiments, small cell management system 134 can be included within central management system 118 as a stand-alone unit or as part of RRM system 130.

As referred to herein in this Specification, a 'small cell radio' can be referred to interchangeably as a 'small cell', a 'femtocell' or a 'pico cell'. As referred to herein in this Specification, a 'macro cell radio' can be referred to interchangeably as a 'macro cell', a 'macro radio' or a 'macro'. In various embodiments, any of radio access points 114a-114c can be deployed as a stand-alone WLAN radio access point to provide wireless (e.g., WiFi, WiMAX, etc.) coverage for one or more WLANs, which can be managed and/or controlled via WLC 136.

As shown in FIG. 1, UE 112a-112e may be served (e.g., logically connected to via an over-the-air interface) by a serving or source radio access point, as indicated by the solid line between each UE and a corresponding radio access point (e.g., UE 112a-112b served by radio access point 114a; UE 112c-112d served by radio access point 114b; and UE 112e served by radio access point 114c). As referred to herein in the Specification, there terms 'radio access point' and 'base station' can be used interchangeably.

As shown in FIG. 1, central management system 118 can, in various embodiments, further include one or more of RRM management system 130, SON management system 132, small cell management system 134 and/or WLC 136, each of which can, among other things, aid in coordinating handover (HO) decisions for UE within RAN 116. In addition to RRM system 130, SON management system 132, small cell management system 134 and/or WLC 136, various other types of management/control nodes can be included within central management system 118, such as, for example, an Operations, Administration and Maintenance (OAM) node or any other management/control node. As referred to herein in this Specification, a handover (HO) may refer to the process, as defined in 3GPP standards, by which UE connectivity (e.g., OTA communications) can be transitioned from a serving or source radio access point to a target radio access point. As referred to herein in this Specification, a handover may also be referred to as a handover event.

In various embodiments, central management system 118 may have visibility of, and/or may interface with one or more parallel networks such as, for example, a macro cell network, a small cell network, a WLAN, etc. In various embodiments, central management system 118 may also interface with one or more other networks or systems such as, for example, data analysis system 122, service provider network 120 and/or internet 124 in order to coordinate handover (HO) control, admission control, congestion control, load balancing, etc. for any UE (e.g., UE 112a-112e) within RAN 116. In essence, central management system 118 may maintain a system-wide view of communication system 100, which may enable central management system 118 to intelligently manage UE connectivity among different access networks in RAN via RRM system 130, SON management system 132, small cell management system 134 and/or WLC 136. Accordingly, central management system 118 can be configured to interface with any element or node of communication system 100 via one or more logical interfaces. In some embodiments, central management system 118 can be deployed as part of service provider network 120, can be deployed within a cloud-based service architecture, and/or can be deployed in a service network for a particular deployment, such as, for example, in an enterprise small cell deployment.

In various embodiments, data analysis system 122 can, via data analytic engine 126, provide one or more calculations, estimations, etc. (generally, calculations) that can be used by central management system to manage UE connectivity among different access networks in RAN 116. In various embodiments, the calculations can be based on measurement data received from central management system 118, which, in turn, receive or collect the measurement data from one or more UE (e.g., UE 112a-112e) and/or one or more radio access points (e.g., radio access points 114a-114c) within RAN 116.

In various embodiments, the location and/or platform for data analysis system 122, central management system 118, service provider network 120 and/or portions of RAN 116 (e.g., non-radio interface portions that are typically responsible for control and/or data management) can be one or more localized units, one or more specialized units or part of one or more virtualized computing platforms that can operate as part of or within one or more data centers, switching centers, cloud-based service architectures, Software Defined Networks (SDNs), Network Function Virtualization (NFV) architectures, combinations thereof or the like.

In various embodiments, a virtualized computing platform can encompass an emulation of a computer system, network, etc., operating based on the computer architecture and/or functions of a real or hypothetical computer, computer system, network, etc. with particular implementations involving specialized hardware, software, or a combination of both. In various embodiments, a virtualized computing platform may execute or operate via a hypervisor-based virtualization or a container-based virtualization of a server (e.g., blade server, rack server, stand-alone server) using the server's hardware (e.g., processor and memory element) and/or operating system. Thus, in various embodiments, various operational aspects of data analysis system 122, central management system 118, service provider network 120, and/or portions of RAN 116 may be virtualized into one or more cloud-based service architectures, which may allow for distributed management and/or control of radio access points 114a-114c within RAN 116.

Before detailing some of the operational aspects of FIG. 1, it is important to understand common characteristics of load management in commercial architectures. The following foundation is offered earnestly for teaching purposes only and, therefore should not be construed in any way to limit the broad teachings of the present disclosure.

Mobile networks are generating a very large amount of network measurement data or metrics, which are typically in the form of quality and performance measurements. In next generation mobile networks, such as a 5G mobile network, the amount of measurement data is likely to be even more extensive. In a 5G network, the expected density of the base stations (e.g., radio access points) is likely to increase in order to provide increased network capacity thus contributing to the increase in the amount of measurement data generated by mobile networks. Further, the number of mobile terminals (UE) is expected to increase due to the rise of the Internet of Things (IoT) (e.g., M2M communications, connected home, etc.), which will also contribute to an increased amount of measurement data available. Additionally, an increase in the variety of services (e.g., multimedia, Voice over LTE (VoLTE), IP services, etc.) offered to subscribers is likely to increase the amount of measurement data available as such services typically have very distinct Quality of Service (QoS) requirements. Moreover, the introduction to new network architectures such as Software Defined Networks (SDNs), Network Function Virtualization (NFV), cloud computing platforms, etc. is likely to further increase the amount of measurement data available in mobile networks. By leveraging the vast amount of available measurement data, and by applying a Big Data analytic approach (e.g., data processing approach for processing large or complex data sets) to the measurement data generated by mobile networks, it may be possible to provide enhanced flexibilities and performance improvements not only to network operators, but also to end users.

In accordance with at least one embodiment, communication system 100 is configured to provide a system and method to facilitate radio access point load prediction, which can be used to coordinate handover (HO) decisions among one or more radio access points 114a-114c within RAN 116. In various embodiments, the method provided by communication system 100 may facilitate radio access point load prediction through application of a Big Data analytics approach in the context of Radio Resource Management (RRM) and Self-Organizing Network (SON) management to improve network performance and resource utilization efficiency. In various embodiments, the method provided by communication system 100 can be carried out using one or more hardware processors configured for one or more management entities that may be provided in central management system 118 (e.g., RRM system 130, SON management system 132, small cell management system 134, etc.), one or more radio access points 114a-114c and/or data analytics engine 126.

In general, the concept of a radio access point loading within a RAN can be used to quantify the level of resources that the radio access point is currently utilizing. Thus, radio access point loading information can be used to form the basis of many RRM and SON functionalities, which may, collectively, aim to improve the efficiency of resource utilization within communication system 100 (e.g., within RAN 116 and/or service provider network 120). In various embodiments, RRM functionalities (e.g., which can be provided via RRM system 130) can include, among other things, admission control (AC) and/or congestion control operations. In general, admission control operations can be used to limit the admissions of new bearers so that the quality of service (QoS) of admitted users (UE) can be maintained at certain levels and congestion control operations can provide a mechanism to react to situations when a radio access point load may be momentarily too high such that traffic flows may be prioritized, gated, etc. to relieve the congestion. In general, a 'bearer' can refer to a virtual connection between two endpoints, which can be used to pass traffic, which may be associated with a particular service (e.g., IP multimedia, VoLTE, etc.) between the two endpoints.

In some cases, traffic flows may not be uniformly distribution within RAN 116. For example, it may be possible that some radio access points are experiencing a low level of loading and thereby under-utilizing resources, while traffic in other radio access points are experiencing a high level of loading and thereby over-utilizing resources. In various embodiments, SON functionalities (e.g., which can be provided via SON management system 132) can include load balancing (LB) operations. In some embodiments, load balancing operations can include redistributing radio access point loads such that RAN 116 resources can be utilized more efficiently. On the other hand, if some radio access points are experiencing extremely low level of traffic (e.g., they are lightly loaded with UE), it may be more energy efficient to allow these radio access points to be switched off and the UE connected thereto to be handed over to one or more neighboring radio access points. Thus, in some embodiments, SON functionalities can include energy management operations, which may seek to maximize energy savings within RAN 116 through power control and load balancing among radio access points 114a-114c.

In accordance with various embodiments, communication system 100 may provide a framework for a method to automatically predict a change of radio access point load for one or more source radio access point(s) and one or more target radio access point(s) for various potential UE handovers from one or more source radio access point(s) to one or more target radio access points. Stated another way, the framework may, in various embodiments, provide for a method to calculate estimated loads and/or load changes for potential UE handovers such that the estimated loads and/or load changes may be used as a basis in determining whether or not to initiate handover of one or more UE between one or more source radio access points and one or more target radio access points. In various embodiments, the method can be used for RRM and/or SON operations that may be impacted by load information, including, but not limited to admission control, congestion control, load balancing, energy management, combinations thereof or the like.

During operation in at least one embodiment, measurement data may be collected (e.g., received or gathered) for RAN 116 by central management system 118 via one or more elements within central management system 118 (e.g., RRM system 130, SON management system 132, small cell management system 134). Central management system 118 may interface with data analysis system 122 including data analytic engine 126 to analyze the collected measurement data through various data analysis operations. Based on the data analysis operations, central management system 118 can generate one or more control and/or management command(s) and may communicate the command(s) to RAN 116 in order to effectuate control and/or management of one or more radio access points 114a-114c and/or one or more UE 112a-112e. For example, in various embodiments, the command(s) may relate to various RRM operations (e.g., admission, congestion control, etc.) and/or SON operations (e.g., handover decisions for load balancing, power control, energy management, etc.) that are to be carried out by one or more radio access points 114a-114c and/or one or more UE 112a-112e within RAN 116.

In some embodiments, data analysis operations can include operations that involve developing (e.g., performing a series of calculations) a statistical model of radio access point 114a-114c loads and/or load changes within RAN 116 across a number of collected measurement data samples. [Note, the general term 'sample' as referred to herein can be used to refer to any data collected in communication system 100 for a corresponding sample time or sample time period.] In other embodiments, data analysis operations can include operations that involve updating the statistical model using measurement data collected from RAN 116. In still other embodiments, data analysis operations can include operations that involve predicting an estimated load or load change for one or more potential UE handovers using measurement data collected from RAN 116. In still other embodiments, data analysis operations can include operations that involve management or control of RAN 116 (e.g., radio access points 114a-114c within RAN 116) based, at least in part, on application of estimated load or load change information corresponding to one or more potential UE handovers to one or more management or control calculations or decision processes (e.g., for load balancing, power control, energy management, etc.)

The term 'measurement data', as referred to herein in this Specification, can be associated with different quantities depending on the context of operations that are being described in reference to certain measurement data. As referred to herein in this Specification, measurement data used to develop, train or update a statistical model can be referred to as 'historical' measurement data or 'past' measurement data. In various embodiments, historical data can be associated with both one or more source and one or more target radio access point, which can be collected both before and after one or more UE handovers. For example, load or load change data collected both before and after one or more UE handovers can be considered historical data, which can be used to train or re-train (e.g., updated) a given statistical model.

As referred to herein in this Specification, measurement data used to predict an estimated load, load change or any other network behavior for one or more potential UE handovers can be referred to as 'current' or 'new' measurement data or 'observation data'. In various embodiments, current measurement data can be associated with load data collected for a source radio access point and a target radio access point, which can be used to predict a load or load change for one or more potential UE handovers through application of the current measurement data to a trained statistical model. Following one or more UE handovers, additional current measurement data can be collected, which may be associated with the actual load or load change following the one or more UE handovers. The combination of current measurement data that can be collected to predict a network behavior (e.g., load or load change) before one or more UE handovers and current measurement data collected following one or more UE handovers (e.g., actual load or load change measured for the RAN) can become historical or past measurement data as current measurement data can be successively collected and stored through time for use in re-training (e.g., updating) a statistical model.

Consider a general operational example in which it is desired to know the potential impact (e.g., estimated load and/or load change) of a potential UE handover of a given UE, say, for example, UE 112b, from source radio access point 114a to a particular target radio access point, say, for example radio access point 114c. Assume, for purposes of the present example, that a statistical model has been formulated that may quantify loads and/or load changes among radio access points 114a-114c using number of historical measurement data samples collected from RAN 116 (e.g., data collected before and after UE handovers). In general, the formulation process for the statistical model can be referred to as 'training' the statistical model to converge towards (e.g., minimize) a certain error criterion. In various embodiments, statistical models can be trained using supervised training or unsupervised training. For supervised training, input data (e.g., data collected before one or more UE handovers) and outcome data (e.g., data collected following one or more UE handovers) can be used to train a statistical model. For unsupervised training, only input data may be used to train a statistical model. According to the various embodiments described herein, supervised training methodologies are described in which both input and output data are considered in training a statistical model.

For some statistical models, such as, for example, for multiple regression modeling, the error criterion can be mean square error criteria or least-squares criteria, as it is sometimes referenced. In various embodiments, the error criterion can be used to train the statistical model (e.g., update variables, variable weighting, etc. of the model) to minimize the error between predicted loads or load changes calculated using the model and actual measured loads or load changes for historical measurement data collected for a number of past UE handover events.

In some embodiments, a range of error values can be configured for training operations such that the training may continue until the error is minimized within the configured range. Once the statistical model is sufficiently trained, the model can be used to predict estimated loads or load changes for one or more potential UE handover events using current measurement data collected from RAN 116.

In various embodiments, the current measurement data can include signal strength information or path loss information associated with source radio access point 114a and target radio access point 114c, which may be measured by one or more of UE associated with the source radio access point (e.g., UE 112a and/or UE 112b) and/or the source radio access point itself (e.g., via one or more network listen operations in which radio access point 114a measures signal strength information for one or more neighboring radio access points such as radio access point 114b, 114c). Measurement data collected from RAN 116 can also include other types of data, as described for various embodiments discussed herein.

In various embodiments, signal strength or path loss information can be associated with any type of channel quality (Q) indicator for 3GPP-based and/or non-3GPP-based signal strength/quality measurements, depending on deployment type. In some embodiments, for example, 3GPP-based signal strength/quality measurements can include Reference Signal Received Power (RSRP), Reference Signal Received Quality (RSRQ), Received Signal Strength Indicator (RSSI) (e.g., for E-UTRAN carrier signals), Common Pilot Channel (CPICH) energy per chip to total power spectral density (Ec/Io) and/or CPICH Received Signal Code Power (RSCP), as defined in 3GPP standards. As defined in 3GPP TS 36.214, RSRP is the linear average over the power contributions of resource elements for resource blocks (RBs) that carry cell-specific reference signals (CRS) within a considered measurement frequency bandwidth. RSRQ is defined as the ratio of the number (N) of RBs of the E-UTRAN carrier RSSI measurement bandwidth (e.g., system bandwidth) multiplied by the RSRP divided by the RSSI, generally expressed as 'N*RSRP/RSSI'. In general, a given UE can measure/determine signal strength information such as, for example, RSRP and/or RSRQ for a serving cell and, if enable, can also measure/determine such information for non-serving cells (e.g., neighboring cells). Thus, in various embodiments, RSRP and/or RSRQ measurements for neighboring radio access points can be enabled for UE 112a-112e. In some embodiments, for example, non-3GPP-based signal/quality measurements can include RSSI (e.g., for WLAN radio access points), Received Channel Power Indicator (RCPI), combinations thereof, or other similar signal strength information.

In various embodiments, RSRP and RSRQ measurements can be used to indicate how good (or bad) the signal for a given UE is between the UE and one or more radio access points. Generally, a direct relationship can exist between the signal quality (or signal strength) of a given UE and the level of load contribution of the UE to a given radio access point. Such a relationship is typically dependent on the radio technology used. For example, in the context of LTE, radio resources are typically described by the number of frequency-time units or RBs, for short, that are required to support a given QoS requirement for a bearer of a UE given a certain channel quality. The bit rate supported by a single RB is dependent on the channel quality. Thus, if a UE has a bad channel quality, the per-RB bit rate is low, and so more RBs are required to support a given QoS requirement. The reverse can be true for a UE having a good channel quality. In another example, say for wideband CDMA (WCDMA), radio resources are typically associated with the total transmit power in the downlink, and the total received power in the uplink for a given UE. The receiver of a UE having a bad channel quality typically requires a higher transmit power to be able to decode a downlink signal properly and vice versa.

Thus, in various embodiments, signal quality or signal strength measurement information can be used as an indicator of load for a given radio access point based on a given relationship that may be determined between signal strength or quality information and load for radio access points. It should be noted that embodiments of the present disclosure do not depend on formulating an exact relationship between signal strength/quality information for radio access points or for any particular radio access technology (RAT) type, rather the formulation of any direct relationship that can be used to relate signal strength/quality information to loads or load changes can be used within the scope of the embodiments of the present disclosure in order to predict loads or load changes (or any other network behavior) according to a given statistical model or methodology.

Returning to the present operational example, the current measurement data can be applied as input values to the trained statistical model via one or more data analysis operations performed via central management system 118 and data analysis system 122 (e.g., via data analytic engine 126) to predict an estimated load or load change for source radio access point 114a and target radio access point 114c for the potential handover of UE 112b. In one sense, the predicted load or load change can be viewed as output values related by the trained statistical model to the set of input values (e.g., current measurement data). In some embodiments, based on the estimated load or load change, a determination can be made regarding whether or not to initiate the handover of UE 112b to target radio access point 114c (e.g., if the predicted load is to be used for load balancing operations, a determination can be made as to whether the load in the RAN becomes more or less balanced among the radio access points). In some embodiments, the estimated load or load change can be used as input values for additional calculations and/or operations such as, for example, power management operations, which may be managed according to some other statistical model, methodology or algorithm(s). In some embodiments, current measurement data can be accumulated or stored through time in order to re-train (e.g., update) the statistical model used for predicting estimated loads or load changes for RAN 116.

Accordingly, the method provided by communication system 100 may provide a powerful, technology agnostic framework for a method to predict loads and/or load changes in RAN 116 using one or more statistical models and measurement data (e.g., historical and current) collected from RAN 116. Additionally, the method may provide for the ability to use predicted loads and/or load changes as inputs to other algorithms, statistical models, methodologies, etc., which may provide for the efficient management and/or control of RAN 116.

Algorithmic Framework for Load Prediction Method

A discussion is now provided, which describes an example algorithmic framework for the load prediction method that can be provided in accordance with at least one embodiment of communication system 100. Certain variables are used to describe the framework including the variable 'i', which may be used to identify a particular source radio access point, and the variable 'j', which may be used to identify a particular target radio access point for various load/load change predictions for one or more handover (HO) events.

For example, let $x_i(x)$ be the x-percentile of the channel quality Q at a given UE served by a particular serving (source) radio access point i. If the UE were to perform a HO to a particular target radio access point j, the x-percentile of the channel quality Q at the UE associated with the target radio access point j can be represented as $x_j(x)$. The channel quality Q can be any signal strength/quality measurement as discussed herein. The difference between the two quantities can be represented as shown in Equation 1 such that:

$$\Delta x_{i,j}(x) = x_i(x) - x_j(x) \quad \text{(Eq. 1)}$$

Furthermore, let $\rho_i$ and $\rho_j$ represent the loads of the radio access points associated with i and j before a potential handover occurs and let the loads $\rho_i'$ and $\rho_j'$ represent the loads for the respective radio access points over after the potential handover such that the estimates for the loads represented as shown in Equations 2 and 3 such that:

$$\hat{\rho}_i' = f_1(\rho_k, \Delta_{i,j}(x)), k=1,2,\ldots,N_i \quad \text{(Eq. 2)}$$

$$\hat{\rho}_j' = f_2(\rho_k, \Delta_{i,j}(x)), k=1,2,\ldots,N_j \quad \text{(Eq. 3)}$$

For Equations 2 and 3, respectively, $N_i$ and $N_j$ represent the number of neighbors associated with radio access points i and j. In some embodiments, it may not be necessary to take into account the loads of radio access points which are not involved in the handover (e.g., neighboring radio access points), such that Equations 2 and 3 can be reduced to Equations 4 and 5, respectively, as:

$$\hat{\rho}_i' = f_1(\rho_i, \Delta_{i,j}(x)) \quad \text{(Eq. 4)}$$

$$\hat{\rho}_j' = f_2(\rho_j, \Delta_{i,j}(x)) \quad \text{(Eq. 5)}$$

In various embodiments, the functions $f_1(.)$ and $f_2(.)$ can correspond to given statistical models that can be used to predict the new load of the source and target radio access points after the occurrence of the potential handover, respectively. Thus, in various embodiments, load prediction as provided by communication system 100 can be generally reduced to: 1) formulating statistical models to predict source and target radio access point loads, and 2) using the models to predict new estimated loads $(\hat{\rho}_i', \hat{\rho}_j')$ given the current state $(\rho_i, \rho_j, \Delta_{i,j}(x))$ of the system (e.g., using current measurement data).

In some embodiments, the term $\Delta_{i,j}(x)$ may be used to compress the two variables $x_i(x)$ and $x_j(x)$) into a single variable. The advantage of doing so might be to reduce the number of variables for a given model, which may therefore make the model more succinct. However, it is possible that the each of the variables may have a different impact on a given model. Thus, in some embodiments, it may be advantageous to express the individual variables explicitly as shown in Equations 6 and 7 such that:

$$\hat{\rho}_i' = f_1(\rho_i, x_i(x), x_j(x)) \quad \text{(Eq. 6)}$$

$$\hat{\rho}_i' = f_2(\rho_i, x_i(x), x_j(x)) \quad \text{(Eq. 7)}$$

In various embodiments, it is possible to take into account other parameters in a given load definition (e.g., as shown in Equation 1). For example, if a user connected to radio access point i is transmitting using an active bearer with a guaranteed bit rate (GBR) of $\tilde{R}_i$, Equations 6 and 7 can be modified, in some embodiments, to include the GBR as shown in Equations 8 and 9, respectively, such that:

$$\hat{\rho}_i' = f_1(\rho_i, \Delta_{i,j}(x), Z_i) \quad \text{(Eq. 8)}$$

$$\hat{\rho}_j' = f_2(\rho_j, \Delta_{i,j}(x), Z_i) \quad \text{(Eq. 9)}$$

For Equations 8 and 9, $Z_i = \tilde{R}_i$ can represent the additional parameter that may impact the load definition. Moreover, if, in some embodiments, a certain delay requirement $\tilde{\tau}_i$ has an impact to a given load definition, the parameter $Z_i$ can easily be modified to represent a vector (e.g., $Z_i = (\tilde{R}_i, \tilde{\tau}_i)$) and so on depending on the load definition for a given statistical model. It is important to note that if multiple bearers (e.g., for different services) are involved for the same user connected to radio access point i, each element of the parameter vector $Z_i$ may represent the aggregated value over all bearers for the same user. For example, the parameter $\tilde{R}_i$ may now represent the averaged GBR over all bearers of the same user.

It is also important to note that the concept of including additional parameters such as $Z_i$ is very powerful, as it opens to door to many different types of information and/or measurements that may available in communication system 100 to be used in predicting estimated loads for one or more UE handovers for one or more source and target radio access points. For example, in some embodiments, the framework of the method provided by communication system 100 may allow relative UE and/or radio access point positioning information to be easily incorporated as additional parameters with minimal modification to a given model used for predicting estimated loads or load changes.

In various embodiments, any additional parameters can be included in a load definition including, but not limited to: QoS Class Identifier (QCI), Maximum Bit Rate (MBR), Allocation and Retention Priority (ARP), Access Point Name (APN) Aggregate Maximum Bit Rate (A-AMBR), UE Aggregate Maximum Bit Rate (UE-AMBR), combinations thereof or the like. QCI is typically used in LTE deployments and contains a set of indices in which each index identifies a particular QoS class. In various embodiments, each QoS class can correspond to a set of parameters that define resource allocation of a service such as, priority, Packet Delay Budget (PDB) and/or Packet Error Loss Rate (PELR), each of which can be defined by one or more operator and/or service provider requirements.

In general, ARP refers to priority for allocation of a bearer or service. In general, A-AMBR can refer to the maximum allowed total non-GBR throughput to a specific APN (e.g., internet 124 or any other APN). In some cases, A-AMBR can be specified individually for downlink communications (e.g., communications toward UE) and for uplink communications (e.g., communications from UE). In general, UE-AMBR can refer to the maximum allowed total non-GBR throughput for all APNs to which a given UE is communicating. Typically, QCI, ARP, GBR and MBR are associated with GBR bearers while QCI, ARP, A-AMBR and UE-AMBR are typically associated with non-GBR bearers.

In some embodiments, an additional parameter that can be included is an identifier indicating whether or not a bearer belongs to GBR or non-GBR bearer classes. A GBR bearer has a guaranteed bit rate while a non-GBR bearer does not. Although whether a bearer belongs to GBR or non-GBR is typically captured in QCI, such a further distinction of GBR or non-GBR can be used in isolation for statistical modelling if an operator or service provider does not want to capture the other effects that are contained within the QCI.

In still some embodiments, an operator or service provider may desire to include additional parameters related to a subscriber level quality differentiation. For example, if a UE (subscriber) belongs to a gold-level class, then it may have priority over a silver or bronze class of UE. Thus, subscriber-based differentiations can also be captured in a statistical model. The aforementioned examples of additional parameters are only a few of the many parameters that can be captured in a model, definition, etc. using the teachings of the present disclosure. It should be understood that any additional information can be captured in a statistical model, load definition, etc. as may be desired by a network operator and/or service provider within the scope of the teachings of the present disclosure.

In some embodiments, it may be useful to estimate the difference in load (e.g., load change) before and after a given potential handover, rather than estimating the actual load itself. In such embodiments, the estimated load differences can be re-written as shown in Equations 10 and 11 such that:

$$\Delta\hat{\rho}_i = f_1(\Delta_{i,j}(x), Z_i) \quad \text{(Eq. 10)}$$

$$\Delta\hat{\rho}_j = f_2(\Delta_{i,j}(x), Z_i) \quad \text{(Eq. 11)}$$

For Equations 10 and 11, respectively, $\Delta\hat{\rho}_i$ and $\Delta\hat{\rho}_j$ can represent the estimates of the load differences $\Delta\rho_i = \rho_i' - \rho_i$ and $\Delta\rho_j = \rho_j' - \rho_j$. Further for Equations 10 and 11, the parameter $\Delta_{i,j}(x)$ may be assumed to be an independent variable rather than representing the absolute values $x_i(x)$ and $x_j(x)$.

In various embodiments, one advantage of the formulations described above are that they are agnostic to any exact given model that may be used for predicting loads or load changes. In other words, the framework of the method provided by communication system 100 may be reduced, generally, to establishing set of parameters associated with a given statistical model relating a set of input values to a set of output values. For example, for Equations 10 and 11, the output values are $\Delta\rho_i$ and $\Delta\rho_j$, although it should be understood that the same methodology can apply to other scenarios where different parameters may be involved. As the exact statistical model for predicting load is not involved for formulation of the equations discussed above, the framework of the method provided by communication system 100 is not sensitive to any change deployment scenario. Thus, the framework of the method provided by communication system 100 can potentially be applied to scenarios where multiple vendors are potentially involved.

Turning back to Equation 11, the index i is used to refer to the identity of a given source radio access point. In some embodiments, radio access point-specific impacts in estimating a load increase of a given target radio access point j may be present for a given model. However, in general, the load increase may be agnostic to the identity of the source cell. Thus, by excluding the source cell identity, a statistical model can be built based on a more diverse set of data sources. In some embodiments, an advantage of excluding the source cell identity is that more data can be used to train a given model, and that the input data (e.g., measurement data) can span a wider region within a given sample space for the model.

In various embodiments, the framework of the method provided by communication system 100 can be applied if the objective is to estimate the decrease in radio access point load of a given source radio access point. In such embodiments, the identity of a given target radio access point may be omitted for a given model. Moreover, in various embodiments, the framework provided by communication system 100 can be applied to cases in which it is desired to predict estimated loads or load changes for one or more cells of one or more macro cell radio(s) and/or small cell radio(s) (e.g., for 3GPP-based deployments of radio access points 114a-114c). Cell radios can often serve multiple cells in a given coverage area. The cells are typically distinguished via Primary Scrambling Codes (PSCs), for example, for 3G deployments; or are distinguished via Physical Cell Identities (PCIs), for example, for 4G/LTE deployments; or can be distinguished using other identifiers, as may be provided by 3GPP standards. Thus, using the framework of the method provided by communication system 100, estimated cell loads or cell load changes can also be predicted using one or more statistical models that include parameters to characterize loads for cells of one or more cell radios.

Thus, in various embodiments, the framework of the method provided by communication system 100 can use data analytics within the context of Big Data based on the measurement capability of the network, including but not limited to, facilities such as Minimal Drive Test (MDT). Although such a framework is flexible in that it does not restrict a particular statistical or machine learning methodology to be used, a multiple regression example for a given statistical model represented by the function $f_2(.)$ for Equation 11 is provided below, which illustrates how the framework of the method provided by communication system 100 can be applied in at least one embodiment. It should be understood, however, that the multiple regression example discussed below is only one example of a statistical model that can be used according to the framework discussed herein. Any other statistical model can be used within the scope of the present disclosure.

Multiple Regression Example

For the multiple regression example described herein, the focus is on load prediction of a target radio access point due to a potential handover of a given UE; thus, Equation 11 is more relevant to the example. In an embodiment in which the prediction is agnostic to the source cell identity, the parameters in Equation 11 can be replaced by $\Delta_{*,j}(x)$ and $Z_*$. However, it is important to note that the method provided by the framework of communication system 100 can be applied irrespective of $(\Delta_{*,j}(x), Z_*)$ or $(\Delta_{i,j}(x), Z_i)$.

For the multiple regression example, let $\{\beta_{2,k}\}_{k=0}^{P2}$ be the set of parameters for the model $f_2(.)$ used to predict load changes as described in Equation 11. Furthermore, as an illustration, let $S_n = \{\Delta\rho_j(n), \Delta_{*,j}(x,n)\}$ be a tuple of observation data (e.g., current measurement data) associated with an n-th handover event for a given target radio access point j. Thus, in various embodiments, the exercise of formulating model $f_2(.)$ can reduce to using the data set of $\{S_n, n=1, 2, \ldots, N\}$ to obtain $\{\beta_{2,k}\}_{k=0}^{P2}$ such that a certain error criteria, represented as $g_2(\Delta\hat{\rho}_j - \Delta\rho_j)$ are minimized. A common criterion such as the mean square error criterion is the represented as shown in Equation 12, below:

$$g_2(X) = E[(ERROR)^2] \quad \text{(Eq. 12)}$$

For Equation 12, E[.] refers to the expectation operator. The criterion represented by Equation 12 is sometimes referred to as the least-squares method. For the multiple regression example, further let $X^T = (X_1, X_2, \ldots, X_p)$, where $X_i$ is the i-th input independent variable, and Y is the dependent variable (e.g., the output variable) that is value that is desired to be predicted. Accordingly, the general regression model can take on the form shown in Equation 13 such that:

$$Y = f(X) = \beta_0 + \Sigma_{i=1}^{P} h(X_i)\beta_i \quad \text{(Eq. 13)}$$

For Equation 13, the $\beta_i$'s can represent unknown parameters, and the function h(.) can be used to transform the variable $X_i$ in case it is desired to model any nonlinearity. It is important to note that even if h(.) may be a nonlinear function, the general regression model as shown in Equation 13 is still a linear model, as it is the $\beta = (\beta_0, \beta_1, \ldots, \beta_p)^T$ that are sought to be to optimized according to the error criterion. Using the above general regression model, and assuming $X = h(X')$ for some X' without the loss of generality, Equation 13 can be re-written as shown in Equation 14 such that:

$$Y = f(X) = \beta_0 + \Sigma_{i=1}^{P} X_i \beta_i \quad \text{(Eq. 14)}$$

Equation 14 is often referred to generally as a multiple linear regression model. Applying Equation 11 to Equation 14 using the least square criterion shown in Equation 12 [note other potential inputs are ignored for now for illustrative simplicity, without the loss of generality], the solution to coefficient(s) $\{\beta_{2,k}\}_{k=0}^{P2}$ for 'N' samples of measurement data can be obtained as shown in Equations 15 thru 18 as:

$$\beta_2=(X_2^T X_2)^{-1} X_2^T y_2=(\beta_{2,0},\beta_{2,1})^T \quad \text{(Eq. 1)}$$

where $$X_2=(x_{2,1}|x_{2,2}|\ldots|x_{2,N})^T \quad \text{(Eq. 2)}$$

$$y_2=(\Delta\rho_j(1),\Delta\rho_j(2),\ldots,\Delta\rho_j(N))^T \quad \text{(Eq. 3)}$$

$$x_{2,n}=(1,\Delta_{*,j}(x,n))^T, n=1,2,\ldots,N \quad \text{(Eq. 4)}$$

It should be noted that the subscript '2' for Equations 15-18 has been used merely to relate the solution to obtain the coefficient(s) shown in Equation 15 to the load model $f_2(.)$ (e.g., as shown in Equation 11). As shown in Equation 16, $X_2$ can represent a matrix, which can be the collection of vectors $x_{2,n}$ based on 'N' samples of measurement data (e.g., the independent variable of the load model). It should be understood that measurement data can include past or historical measurement data that can be used to train or update the multiple linear regression model, or can be new or current measurement data (e.g., observation data), can be applied to the trained model in order to predict a load change for one or more potential UE handovers. As shown in Equation 17, $y_2$ can represent the dependent (e.g., output) variables (e.g., load changes or predicted load changes) for the 'N' samples.

As discussed previously, the framework for the method provided by communication system 100 is agnostic to the exact definition of radio access point load or load changes for any given model. Thus, in the context of the multiple regression example, the general model as shown in Equation 14 can be modified to account for any change to the load model $f_2(.)$ by adjusting the intermediate variable $x_{2,n}$ accordingly. For example, if GBR is deemed critical in defining the load change for one or more radio access points for one or more potential handover events, the multiple linear regression model provided by Equation 14 can be modified in various embodiments to account for the change in the load model (e.g., update Equation 11 to include GBR information) by adjusting the intermediate variable $x_{2,n}$, as shown in Equation 19, such that:

$$x_{2,n}=(1,\Delta_{*,j}(x,n),\tilde{R}_*)^T, n=1,2,\ldots,N. \quad \text{(Eq. 5)}$$

Thus, as shown in Equation 19, the intermediate variable can account for GBR via the $\tilde{R}_*$ variable. Consider another example in which it is determined that the load $\rho_i$ of the source radio access point i has a potential impact to the target radio access point load increase. Thus, the variable $x_{2,n}$ can simply be modified as shown in Equation 20 such that:

$$x_{2,n}=(1,\Delta_{*,j}(x,n),\rho_i(n))^T, n=1,2,\ldots,N. \quad \text{(Eq. 20)}$$

Referring back now to the general multiple regression model shown in Equation 14, a predicted load change of the target radio access point j after a potential handover for a certain UE given a new or current set of data measurements at time n' (e.g., as opposed to past or historical data measurements used for training) may be calculated as shown in Equation 21 such that:

$$\Delta\hat{\rho}_j = x_{2,n'}^T \beta_2 \quad \text{(Eq. 21)}$$

For Equation 21, $x_{2,n'}^T$, are the observed data vector (e.g., current measurement data) at time n' before the potential handover to the target radio access point j may be initiated.

In various embodiments, one advantage of using a multiple regression model to predict a radio access point load or load change is that the mathematical framework of such a statistical model is well understood. For example, the accuracy of the estimated parameters (e.g., predicted loads or load changes) can be quantified and the accuracy of the statistical model can be assessed (e.g., using a certain error criterion) to fine-tune the model; thereby providing a large amount of flexibility for adjusting the parameters of the model in order improve the accuracy for predicting loads or load changes for one or more potential UE handovers for one or more radio access points.

Further, in some embodiments, techniques such as variable subset selection can be used to potentially improve accuracy for the statistical model as well as model interpretability. Further, in some embodiments, dimensionality reduction techniques can potentially be applied on top of regression analysis to predict loads or load changes. It should be understood however, that other statistical models can be used other than the multiple regression model discussed in the present example. The multiple regression example discussed herein is only one of the many statistical models that can be used to predict loads or load changes for one or more potential UE handovers. For example, in various embodiments a given statistical model can be a decision tree model, a neural network model or the like. In various embodiments, other statistical methodologies could be used to predict loads or load changes including, but not limited to, decision tree regression, model averaging, boosting algorithms, etc. Thus, the framework of the method provided by communication system 100 can be applied to any statistical model and/or algorithm that may be used to predict loads or load changes within the scope of the teachings of the present disclosure.

Generalization for M-Fold Handover Events

Although the general framework for the method provided by communication system 100 and the multiple regression example discussed above have been described with respect to a singular potential UE handover for a given UE (e.g., any of UE 112a-112d), the framework for the method provided by communication system 100 can be modified to predict loads or load changes for multiple UE handovers from one or more source radio access points to one more target radio access points. Thus, in various embodiments, the framework of the method provided by communication system 100 can be modified to account for multiple handover events, also referred to herein as 'M-fold' handover events.

For example, the load prediction method provided by communication system 100 gathers the statistics of a target radio access point load before ($\rho_j$) and after ($\rho_j'$) handover of a UE occurs. In some embodiments, a load or load change estimation may need to be averaged over some time interval $\tau_j$ in order to smooth out the variations in measurement data. For example, in some cases, if the handover rate for a given deployment is very high (e.g., lots of users moving in/out of radio access point coverage areas), more than one handover event may occur during $\tau_j$ (e.g., M-fold handover events). As a result of such M-fold handover events, an observed load or load change can include load contributions due to multiple UE handovers from a given source radio access point. Thus, the visibility of a load contribution due to the potential handover of a single user may be lost.

In various embodiments, M-fold handover events can be accounted for in a given statistical model by adjusting the model accordingly. For example, consider the multiple regression example discussed above. In some embodiments, the general multiple regression model as shown in Equation 14 can be modified to account for M handover events that may have occurred within a given time window $\tau_j$. An example modification of Equation 14 is shown in Equation 22, below, as:

$$\tilde{f}(X) = \tilde{\beta}_0 + \Sigma_{m=1}^{M} \Sigma_{i=1}^{P} X_i^{(m)} \beta_i^{(m)} \quad \text{(Eq. 22)}$$

For Equation 22, $\tilde{f}(X)$ may represent the load increase of a given target radio access point j due to M handovers within a given time window $\tau_j$ and the quantities $X_i^{(m)}$ and $\beta_i^{(m)}$ may correspond, respectively, to the input data (e.g., measurement data) and the regression coefficient for the m-th handover within the given time interval $\tau_j$. The same procedure as outlined earlier applies. In certain embodiments, it can be assumed that the variables $X_i^{(m)}$ are not dependent on the order of UE handovers within the time window $\tau_j$, which is often a reasonable assumption, such that, for example, $\beta_i^{(m)} = \beta_i$. Based on such an assumption, the average load increase $f(X)$ due to a single handover within the time $\tau_j$ can be expressed as shown in Equation 23, below, as:

$$f(X) = \frac{\tilde{\beta}_0}{M} + \sum_{i=1}^{p} \beta_i \left( \frac{1}{M} \sum_{m=1}^{M} X_i^{(m)} \right) \quad \text{(Eq. 23)}$$

For Equation 23, by letting $\beta_0 = \tilde{\beta}_0/M$, and $X_i = \Sigma_{m=1}^{M} X_i^{(m)}/M$, the formulation to account for M-fold handover events can be expressed as shown in Equation 24, below, as:

$$f(X) = \beta_0 + \Sigma_{i=1}^{P} \beta_i X_i \quad \text{(Eq. 24)}$$

It should be noted that, based on the substitution for $\beta_0$ and $X_i$ shown above, Equation 24 is the original expression for the general multiple regression model as illustrated in Equation 14. In various embodiments, the approximation of aggregating the variables $X_i^{(m)}$ into a single variable $X_i$ can be made based on simple averaging; however, any more refined approximations can be made to aggregate the variables $X_i^{(m)}$ into a single variable $X_i$ within the scope of the teachings of the present disclosure. Moreover, in various embodiments, the modification of the model to account for M-fold handover events can also be applied to cases in which there are multiple bearers for each UE.

Accordingly, the system and method provided by communication system 100 may allow many types of statistical and/or machine learning models, algorithms, etc. to be used for predicting a load or load change for one or more potential handover events. In various embodiments, the system and method provided by communication system 100 may provide for forming a realizable and/or quantifiable link between Big Data analytics (e.g., via data analysis system 122 and data analytic engine 126) and management and/or control (e.g., via central management system 118) of any of one or more nodes (e.g., radio access points 114a-114c) and/or one or more UE (e.g., UE 112a-112e) of any radio access network (e.g., RAN 116) for any radio access technology (RAT) type (e.g., 3GPP-based, non-3GPP-based). In various embodiments, the management and/or control can encompass radio resource management/control (e.g., via RRM system 130), SON management/control (e.g., via SON management system 132), small cell network management/control (e.g., via small cell management system 134), combinations thereof or the like.

More particularly, by providing the ability to predict any network behaviors such as, for example, radio access point load or load change, the system and method provided by communication system 100 offers a pro-active approach to SON management/control rather than the traditional, reactive approach where adaptations are primarily based on past measurements. Moreover, the system and method provided by communication system 100 may, in various embodiments, provide a technology agnostic framework for predicting any network behaviors that may not be tied to any specific assumptions and/or modelling, such, for example, load definition, interference model, network topology, etc., which may be specific to a particular network and/or technology type (e.g., 3GPP-based or non-3GPP-based). Instead, particular details for any particular network and/or technology type can be automatically absorbed into a given statistical model based on actual data (e.g., measurement data) gathered for a given network. As a result, the system and method provided by communication system 100 can be relatively straightforward to deploy in any environment and may be particularly useful in a Heterogeneous Network (HetNet) environment in which multiple RAT types may be present.

Figure 2:
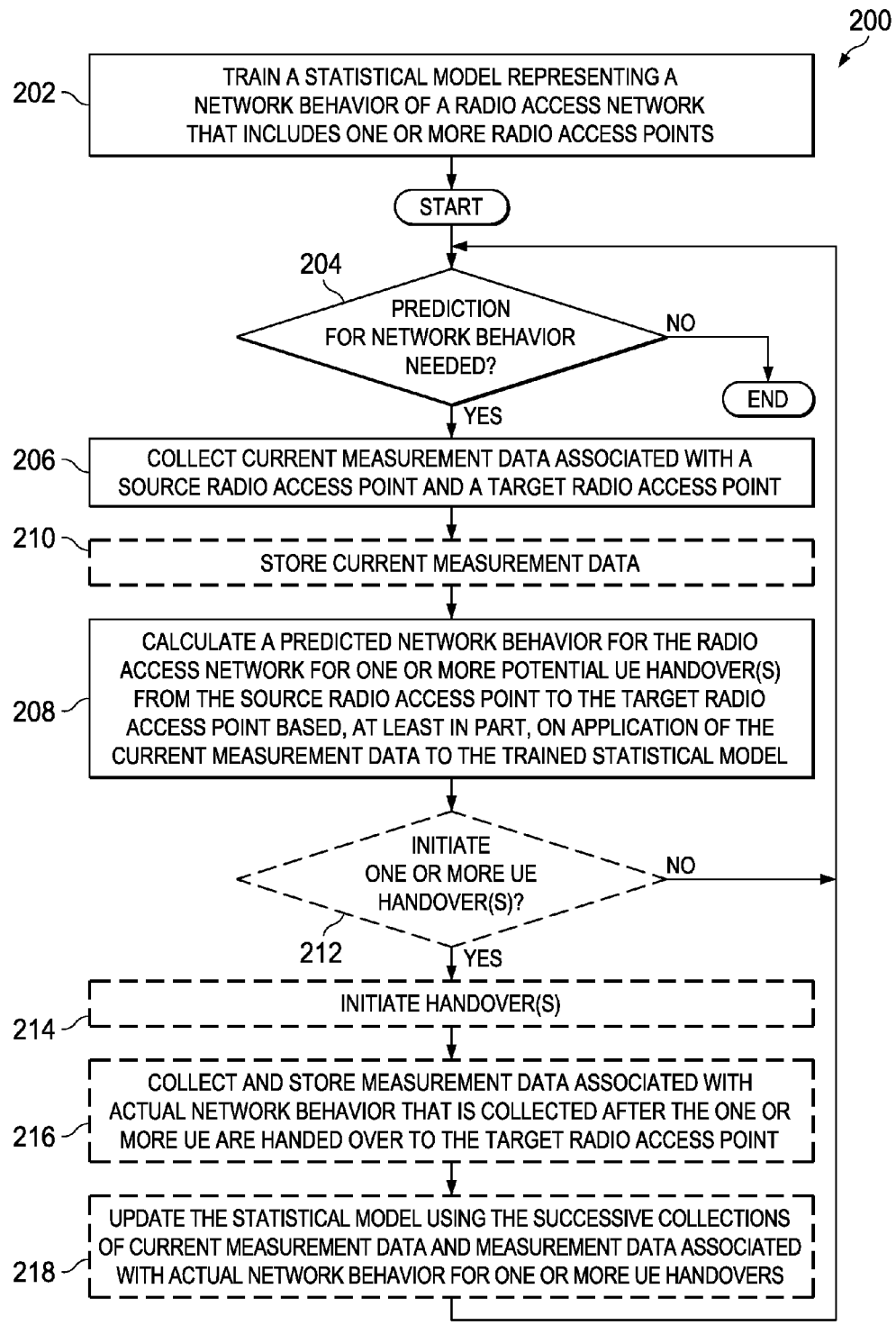
FIG. 2 is a simplified flow diagram illustrating example operations associated with providing prediction of a network behavior in accordance with one potential embodiment of the communication system.

Turning to FIG. 2, FIG. 2 is a simplified flow diagram illustrating example operations 200 associated with providing prediction for a network behavior in accordance with one potential embodiment of communication system 100. Although various examples discussed herein are provided with respect to a given network behavior (e.g., load or load change), the method provided by communication system 100 can be applied to predict any network behavior, as illustrated through operations 200.

Prior to performing operations associated with providing prediction for a certain network behavior, operations 200 can include training at 202 a statistical model representing a network behavior a radio access network including one or more radio access points. In various embodiments, the statistical model can be trained using, at least in part, historical measurement data gathered from the radio access network that is associated with multiple previous UE handovers among the radio access points. The historical measurement data used to train the statistical model can include data gathered before and after the previous UE handovers for source and target radio access points in the RAN. In various embodiments, the statistical model can be trained using data analytic engine 126 using, at least in part, historical measurement data collected from RAN 116 via central management system 118 (e.g., using one or more nodes within central management system 118) both before and after one or more UE handovers.

In various embodiments, the statistical model can be trained using an error criterion such that one or more parameters of the model may be adjusted during the training such that an error between network behavior predictions output by the model and actual network behavior measured for the radio access network may be minimized. In some embodiments, the error criterion can be based on a mean square error criterion for minimizing the error between network behavior predictions and actual network behavior. In some embodiments, a determination can be made regarding whether the statistical model is sufficiently trained based on comparison to an expected error criterion range such that, if the error (e.g., mean square error) between the outcome of the network behavior prediction and the actual network behavior converges to within a predetermined range, then the statistical model can be deemed sufficient to perform network prediction operations as discussed herein.

Following training of the statistical model, the statistical model can be used to predict network behavior beginning at 204 in which the operations can include determining whether a prediction for the network behavior is needed. For example, in some embodiments, central management system 118 may determine that loading, congestion, UE admission, etc. for RAN 116 should be managed, optimized, etc. through one or more UE handovers among radio access points 114a-114c. Thus, a prediction of network behavior may be needed. If no prediction is needed, the operations may end.

If, however, a prediction of the network behavior is needed, the operations can continue to 206 in which current measurement data associated with a source radio access point and a target radio access point in the radio access network can be collected. At 208, the operations can include calculating a predicted network behavior for the radio access network for one or more potential UE handover(s) from the source radio access point to a target radio access point based, at least in part, on application of the current measurement data to the trained statistical model and the operations may return to 204 to determine whether another prediction for the network behavior is needed.

In general, operations 202, 204, 206 and 208 illustrate the core of the framework for the method provided by communication system 100. However, one advantage of the method provided by communication system 100 is that the accuracy of a given statistical model to accurately predict a given network behavior can be fine-tuned using successive collections of measurement data gathered before and after UE may be handed over to one or more target radio access points can following one or more network behavior predictions. Thus, in various embodiments, the method provided by communication system 100 can provide for re-training a given statistical model across time that that model can be used to more accurately predict a given network behavior.

Thus, in some embodiments, current measurement data collected at 206 can be stored at 210. In various embodiments, the current measurement data can be stored in one or more memory elements, storages (e.g., databases) associated with data analysis system 122 and/or central management system 118. Again, the prediction of network behavior can be calculated at 208 and, in some embodiments, a determination can be made at 212 whether or not to initiate one or more UE handovers based on the result of the network behavior prediction. If it is determined that no handovers are to be initiated, the operations can return to 204, as discussed above. However, if it is determined that one or more UE handovers are to be initiated, the operations continue to 214 in which the one or more UE handovers can be initiated to handover the one or more UE to the target radio access point. In various embodiments, the UE handovers can be initiated via one or more commands generated via central management system 118 and communicated to RAN 116.

At 216, measurement data associated with actual network behavior of the radio access network after the handover of the one or more UE to the target radio access point can be collected and stored. At 218, the statistical model can be updated using the successive collections of current measurement data and measurement data associated with actual network behavior for one or more UE handovers.

In various embodiments, the updating at 218 can occur at predetermined time intervals (e.g., in hours, minutes, etc.), at predetermined times of day (e.g., noon, midnight, rush hour, etc.), as radio access points are taken online/offline (e.g., to handle increased/decreased user traffic), combinations thereof or the like as may be determined by a network operator and/or service provider. Thus, as shown in FIG. 2, the method provided by communication system 100 can provide a powerful framework for predicting network behavior for a variety of network conditions, statistical models, etc. to provide for control and/or management of one or more radio access points 114a-114c and/or one or more UE 112a-112a that may be associated with RAN 116.

Additional flow diagrams are provided herein below to illustrate other example operations that can be performed to predict particular network behaviors in accordance with various embodiments of communication system 100.

Figure 3:
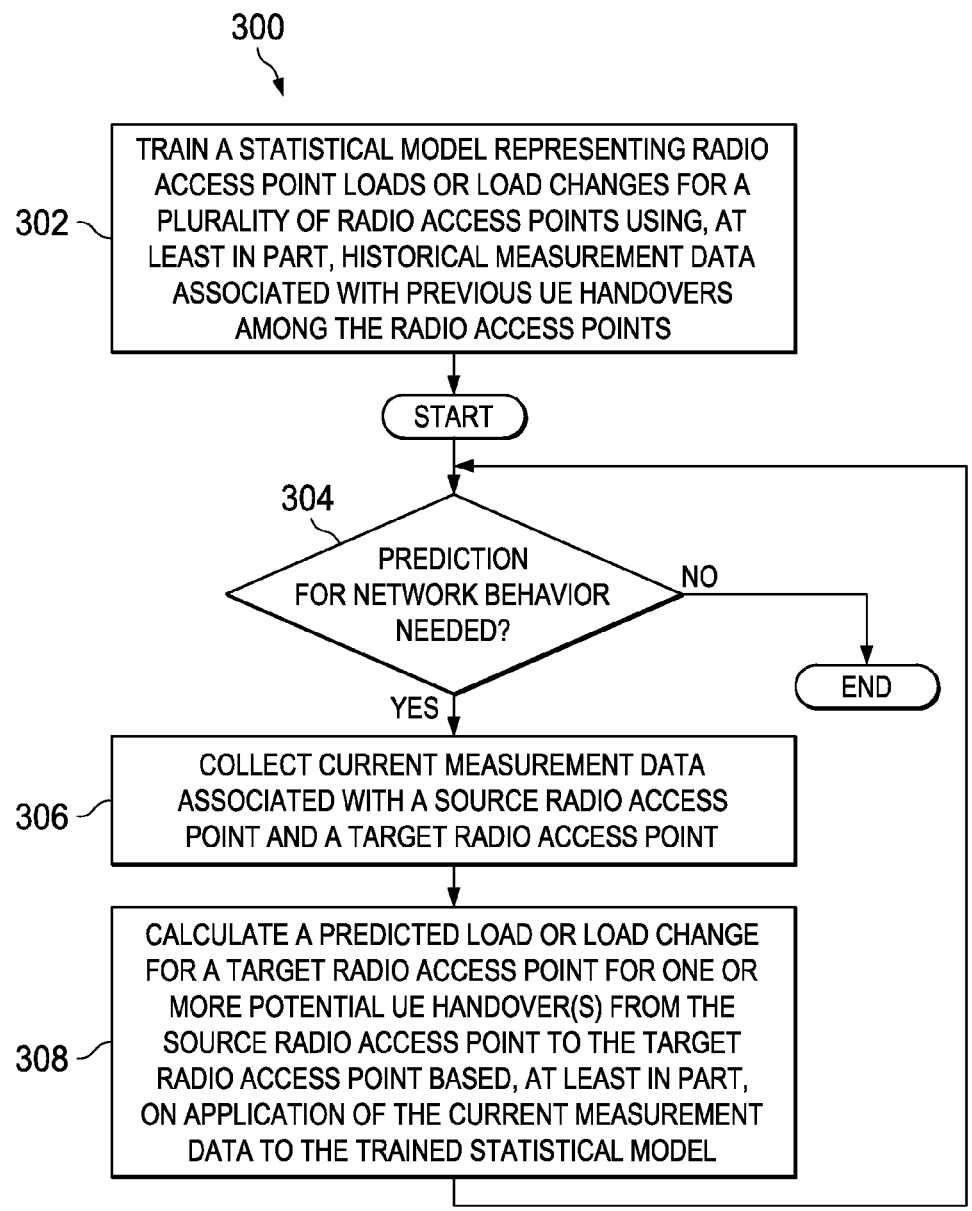
FIG. 3 is a simplified flow diagram illustrating example operations associated with providing radio access point load prediction in a network environment in accordance with one potential embodiment of the communication system.

Turning to FIG. 3, FIG. 3 is a simplified flow diagram illustrating example operations 300 associated with providing radio access point load prediction in a network environment in accordance with one potential embodiment of communication system 100. In general, operations 300 illustrate application of the general operational framework illustrated in FIG. 2 to the specific application of predicting load or load changes for one or more potential UE handovers for RAN 116. Operations associated with updating the statistical model discussed in FIG. 3 are not discussed for purposes of brevity; however, it should be understood that operations 210, 212, 214, 216, and 218 as discussed for FIG. 2 can be applied to the example load prediction operations 300 discussed below in accordance with various embodiments of communication system 100.

Prior to performing operations associated with providing radio access point load predictions for one or more potential UE handovers, operations 300 can include training at 302 a statistical model representing radio access point loads or load changes for a plurality of radio access points using, at least in part, historical measurement data associated with previous UE handovers among the radio access points. In various embodiment, the historical measurement data can include data collected both before and after the UE handovers, which can be used to train the statistical model towards a certain error criterion based on the error (e.g., mean square error) between the outcome of load or load change predictions calculated during the training and actual loads or load changes measured for the radio access points following the UE handovers.

Following training of the statistical model to predict loads or load changes, the statistical model can be used to predict loads or load changes beginning at 304 in which the operations can include determining whether a prediction for a load or load change is needed. For example, in some embodiments, central management system 118 may determine that loading, energy savings, etc. for RAN 116 should be managed, optimized, etc. through one or more UE handovers among radio access points 114a-114c. Thus, a prediction of a load or load change may be needed. If no prediction is needed, the operations may end.

If, however, a prediction of a load or load change is needed, the operations can continue to 306 in which current measurement data associated with a source radio access point and a target radio access point in the radio access network can be collected. In various embodiments, the current measurement data can include current channel quality information which can be used to determine a current load for the source radio access point and the target radio access point. At 308, the operations can include calculating a predicted load or load change for a target radio access point for one or more potential UE handover(s) from the source radio access point to the target radio access point based, at least in part, on application of the current measurement data to the trained statistical model and the operations may return to 304 to determine whether another prediction of a load or load change for one or more potential UE handovers is needed.

Thus, as shown in FIG. 3, the method provided by communication system 100 can facilitate prediction of loads or load changes for one or more radio access points 114a-114c within RAN 116. In some embodiments, based on the load or load change prediction, additional operations can be provided to determine whether or not to initiate handover of one or more UE. In some embodiments, a load or load change prediction (e.g., outcome of current measurement data to a given statistical model) can be further applied to another algorithm and/or statistical model that may represent some other change within RAN 116, which may influence the decision of whether or not to initiate handover of one or more UE.

For example, in some embodiments, UE loads or load changes can be associated with a model or algorithm that can be to estimate energy consumption and/or maximum energy savings that may be realized by for a given radio access network if one or more radio access points are taken offline (e.g., powered down) and the UE connected thereto handed over to one or more neighboring radio access points. Understanding how load or load predictions can be applied a model or algorithm to estimate a maximum energy savings may be best illustrated in the context of a radio access network that includes both macro and small cell radios such as the radio access network illustrated in the example use case illustrated in FIG. 4.

Figure 4:
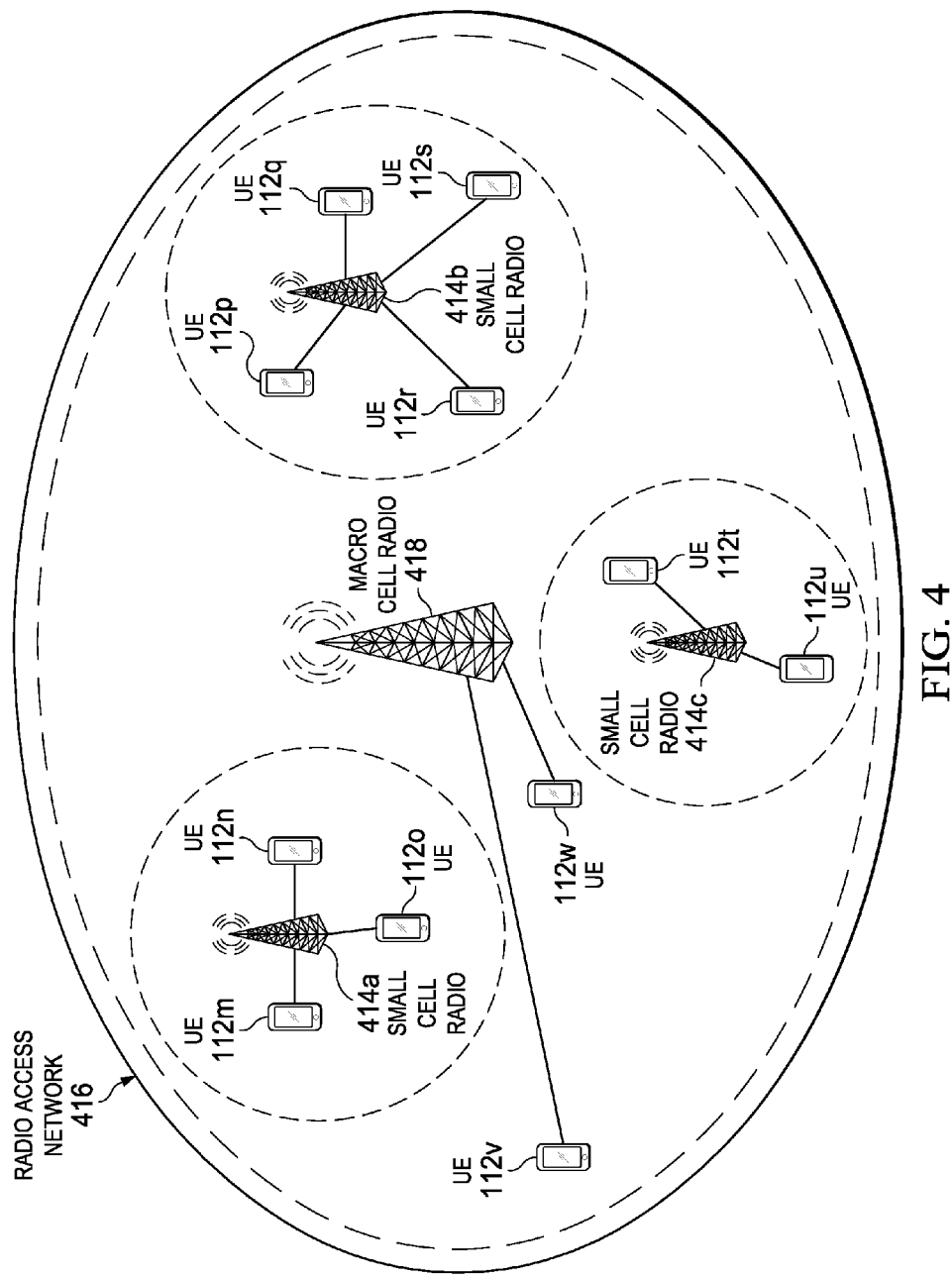
FIG. 4 is a simplified block diagram illustrating an example radio access network use case that can be associated with one potential embodiment of the communication system.

Turning to FIG. 4, FIG. 4 is a simplified block diagram illustrating an example radio access network use case for an example radio access network 416 that can be associated with one potential embodiment of communication system 100, which can provide a method for determining a maximum energy savings based on or more predicted load changes for one or more potential UE handovers within RAN 416. FIG. 4 includes RAN 416, which can include a number of radio access points, such as, for example small cell radios 414a-414c (e.g., HNBs and/or HeNBs), which may be part of a small cell deployment/small cell network, and a macro cell radio 418 (e.g., NodeB or NodeB), which may be part of a macro cell deployment/macro cell network. Also shown in FIG. 4 are a number of UE 112m-112w, which may have the same capabilities as UE 112a-112e as shown in FIG. 1, according to various embodiments of the present disclosure. Each small cell radio 414a-414c may serve a corresponding small cell coverage area, which is illustrated by the smaller dashed-line circle surrounding each small cell radio 414a-414c. Macro cell radio 418 may serve a corresponding macro cell coverage area, which is illustrated by the larger dashed-line circle surrounding macro cell radio 418 and small cell radios 414a-414c.

As shown in FIG. 4, UE 112m-112o are currently served by small cell radio 414a within the cell coverage area (small dashed-line circle) provided by small cell radio 414a; UE 112p-112s are currently served by small cell radio 414b within the cell coverage area provided by small cell radio 414b; and UE 112t-112u are currently served by small cell radio 414c within the cell coverage area provided by small cell radio 414c. As UE 112v and 112w are outside the cell coverage areas of any small cell radio, UE 112v-112w can be served by macro cell radio 418 within the macro overlay (cell coverage area shown by the large dashed-line circle) provided by macro cell radio 418.

Typically, the energy consumption of a given cell radio (macro or small) can consist of a fixed component, which exists irrespective of whether there is any traffic supported by the cell radio (e.g., any UE connected to the cell radio), as well as a component which is dependent on the level of traffic supported by the cell radio. In at least one embodiment, one general approach to providing energy saving for a RAN may be to set a trigger that, if a particular small cell radio is experiencing a low level of traffic, one or more operations can be triggered to determine whether it may be more efficient to handover the UEs currently served by the small cell radio to another small cell radio or another layer (e.g., to a neighboring macro cell radio), and, if so, then a handover can be initiated for the UEs and the particular small cell radio can be turned off; thereby removing the energy overhead for the RAN due to the fixed energy component of the particular small cell radio. By switching off small cells during off-peak hours, energy can be reduced. In some cases, this energy saving can have a significant impact to operating expenditures (OPEX) in network deployments.

Although the general energy saving method described above can take place in many different scenarios, for the purpose of illustration, a scenario is considered where there is a macro overlay (e.g., macro cell coverage area), served by macro cell radio 418, which is represented for algorithmic purposes as macro cell radio 'm', and $N_m$ small cells (e.g., small cell coverage areas) served by small cell radios 414a-414c, which are represented for algorithmic purposes as macro cell radios 'i', where i=1, 2, . . . , $N_m$ for the $N_m$ small cells within the macro overlay and the index of any small cell radio i is not the same as the index for macro cell radio m. Further, let $\rho_m$ be the cell load of the macro overlay, and $\rho_m^{(max)}$ be a parameter representing a maximum allowable load for macro m. Note that the macro overlay provided by macro cell radio 418 may use the same or different frequency as those used by the small cell radios 414a-414c for their corresponding cell coverage areas.

Further, let $\Delta\rho_{m\leftarrow(i)}$ represent the i-th smallest predicted increase in macro cell load after a handover of all users served by a given small cell radio (i). The notation (i) refers to the index of the source cell which give rise to the i-th smallest load contribution to the target cell m. In other words, as shown in Equation 25:

$$\Delta\rho_{m\leftarrow(1)} \leq \Delta\rho_{m\leftarrow(2)} \leq \ldots \leq \Delta\rho_{m\leftarrow(N_m)} \quad \text{(Eq. 25)}$$

In various embodiments, the load contribution quantity $\Delta\rho_{m\leftarrow(i)}$ can be based on the addition of the estimated load contribution from each user from cell i based on a given trained model (e.g., as shown in Equation 21) or any other prediction method. The load contribution quantity includes the estimated macro load following the potential handover of the users via the variable $\hat{\rho}_m'$. In some embodiments, the estimation of the load increase can be calculated by adding an estimated load contribution of each user from served by a given small cell radio i based on a trained model such as, for example, the contribution as represented in Equation 21, above, or any other prediction method within the scope of the present disclosure.

In various embodiments, the method for determining a maximum energy savings for a given RAN (e.g., RAN 416) can generally provide for determining a set of cell radios that can be turned off and have the UE connected thereto handed over to another cell radio without violating the load constraint of the other cell radio. Thus, in various embodiments, the method of determining a maximum energy savings can include either 1) solving an optimization problem to determine a set of small cell radios that can be turned off that will maximize energy savings the RAN within a given target macro cell radio load constraint or 2) solving an optimization problem to determine a set of small cell radios that can be turned off that will minimize energy consumption within the RAN; thereby maximizing energy savings for the RAN.

Regardless of which optimization problem may be chosen, the method provided communication system 100 for determining a maximum energy savings can include determine a set of small cell radios that belong to a set S∈{(1), (2), . . . , (N*)} [note the bracket notation is typically used to denote an ordered set] such that, by turning off and handing over UE connected to the small cell radios to a target macro cell radio, a maximum energy savings for the RAN can be realized while managing the load for the macro cell radio to less than or equal to a given $\rho_m^{(max)}$.

Thus, it should be understood that the goal of providing a maximum energy savings is the same for both of the optimization problems. Accordingly any other optimization problem can be provided within the scope of the present disclosure; the illustration of the two optimization problems merely exemplifies the high flexibility that communication system 100 affords for characterizing or predicting a multitude of possible network behaviors.

Consider, in a first operational example, that the method provided by communication system 100 can provide for determining a maximum energy saving for a given RAN (e.g., RAN 416) by solving an optimization problem characterizing the maximum energy savings to determine a set of small cell radios belonging to a set S∈{(1), (2), . . . , (N*)} such that, by turning off and handing over UE connected to the small cell radios to a target macro cell radio (e.g., macro cell radio 418) energy savings for the RAN can be maximized the load for the macro cell radio to be limited to be less than or equal to a given $\rho_m^{(max)}$. Upon solving the optimization problem and determining the set of small cell radios that provide for the maximized energy savings, handovers can be initiated for the corresponding UE served by each corresponding small cell radio in the set and then each small cell radio can be powered down. Equation 26, shown below, can represent an example optimization problem that can be solved to determine a maximum energy savings for the RAN in accordance with various embodiments of communication system 100.

$$N^* = \max(N' | \rho_m + \Sigma_{i=1}^{N'} \Delta\rho_{m \leftarrow (i)} \leq \rho_m^{(max)}) \quad \text{(Eq. 66)}$$

As noted, one goal of the method for determining a maximized energy savings can be to turn off as many small cell radios i as macro cell radio m can absorb without violating the load constraint for the macro cell radio. Thus, in some embodiments, the operations for determining a maximum energy saving for a given RAN (e.g., RAN 416) can include determining predicted load increases for a given macro cell radio m (e.g., macro cell radio 418) for one or more potential UE handovers from one or more source small cell radios (e.g., 414a-414c) using a given statistical model for a given load model. The predicted load changes can then be applied to the optimization problem for various potential handover scenarios in order to determine a number of small cell radios belonging to the set S∈{(1), (2), . . . , (N*)}.

In some embodiments, as noted above, the method provided by communication system 100 for determining a maximum energy savings for a given RAN (e.g., RAN 416) can be enhanced to include energy consumption considerations such that a different optimization problem can be solved in order to maximize energy savings for the RAN. In various embodiments, total energy consumption for a given small cell radio can be represented as shown in Equation 27.

$$E_i = \tilde{E}_i + h_i(\rho_i) \quad \text{(Eq. 77)}$$

For Equation 27, $E_i$ may represent the total energy consumption of a given small cell radio i, where $\tilde{E}_i$ is the fixed energy consumption which is independent of the traffic load, and $h_i(\rho_i)$ is the load dependent energy consumption for the small cell radio. Further, let $\hat{\rho}_{m \leftarrow i}'$ represent the predicted load of macro cell radio m after the potential handover of all users connected to small cell radio i. Based on the energy consumption characterization represented in Equation 27, an optimization problem for minimizing energy consumption in a given RAN (e.g., RAN 416) can be provided as shown in Equation 28, which can be solved to determine small cell radios belonging to the set S∈{(1), (2), . . . , (N*)} subject to a constraint as shown in Equation 29 in order to minimize energy consumption within the RAN thereby maximizing energy savings for the RAN.

$$\min_{\{a_i\}} \left( h_m\left(\rho_m + \sum_{i=1}^{N_m} a_i \Delta\rho_{m \leftarrow i}\right) - \sum_{i=1}^{N_m} a_i E_i \right) \quad \text{(Eq. 88)}$$

$$\sum_{i=1}^{N_m} a_i \Delta\rho_{m \leftarrow i} \leq \rho_m^{(max)} - \rho_m \quad \text{(Eq. 29)}$$

For Equations 28 and 29, $\alpha_i$ can represent the set of small cell radios within the macro overlay of macro cell radio m that the small cell radios to belonging to the set that can be switched off can by represented as $\alpha_{i \in S} = 1$, and the small cell radios not belonging to the set (e.g., that should remain powered on) can be represented by $\alpha_{i \notin S} = 0$ for $a_i \in \{0,1\}$, $i = 1, 2, \ldots, N_m$.

The first term in the optimization problem shown in Equation 28, $h_m(\rho_m + \Sigma_{i=1}^{N_m} a_i \Delta\rho_{m \leftarrow i})$, can correspond to the energy consumption of the macro with the added load from the set of small cell radios and the second term, $\Sigma_{i=1}^{N_m} a_i E_i$, can correspond to reduction in the total energy when the relevant small cell radios are switched off. It should be noted that, in some cases, the load dependent energy consumption $h_m(\rho_m)$ for macro cell radio m can be a non-convex function, which can potentially make solving optimization very difficult. Thus, in some embodiments, an approximation can be made such that $h_m(\rho_m)$ can be assumed to be a monotonically increasing function, which can simplify solving optimization problem shown in Equation 28.

In various embodiments, since the optimization problem shown in Equation 28 consists of only a single constraint, one solution to the optimization problem can be obtained in linear time O ($N_m$) using an example procedural framework as shown in TABLE 1. For the example procedural framework shown in TABLE 1, (i)' can correspond to the index of a given small cell radio having the (i)'-th largest total energy consumption, (e.g., $E_{(1)'} \geq E_{(2)'} \geq \ldots E_{(i)'} \geq \ldots \geq E_{(N_m)'}$) and T may represent a temporary variable used in the procedural framework.

TABLE 1

EXAMPLE PROCEDURAL FRAMEWORK

| | |
|---|---|
| STEP 1) | Initialize i = 1, S = { }, T = 0 |
| STEP 2) | Set T ← T + $\Delta\rho_{m \leftarrow (i)'}$ |
| STEP 2.1) | Check (a): T ≤ $\rho_m^{(max)}$ − $\rho_m$ |
| STEP 2.1.1) | If (a) is true, then check (b): |
| | $h_m(\rho_m + \Delta\rho_{m \leftarrow (i)'}) - h_m(\rho_m) < E_{(i)'}$ |
| STEP 2.1.1.1) | if (b) is true, then S ← S ∪ (i)'; go to STEP 3 |
| STEP 2.1.1.2) | If (b) is false, then go to STEP 3 |
| STEP 2.1.2) | If (a) is false, then go to STEP 3 |
| STEP 3) | Set i ← i + 1 |
| STEP 3.1) | check (c): i ≤ $N_m$ |
| STEP 3.1.1) | If (c) is true, then go to STEP 2 |
| STEP 3.1.2) | if (c) is false, then return S and end procedure |

For the procedural framework illustrated in TABLE 1, STEP 1 can include initializing the small cell radio index i=1, initializing the set S of small cell radios that results in the highest energy savings for the RAN (e.g., an empty set at the beginning of the procedure) and initializing the temporary variable T=0. STEP 2 can include setting T to be T+$\Delta\rho_{m \leftarrow (i)'}$, for small cell radio i and at STEP 2.1, the procedure can include checking whether there is available load for the macro cell radio to receive UE from small cell radio i, as shown by the relationship (a): T≤$\rho_m^{(max)}$−$\rho_m$. In various embodiments, small cell radio i can correspond to the small cell radio ranked in a manner as noted above in which i=1 can correspond to the small cell radio having the largest total energy consumption for the RAN.

At STEP 2.1.1, if (a) is true (e.g., there is load headroom for the macro to receive handover of the UE from small cell radio i, the procedure can check whether the handover of the UE connected to small cell radio i to the macro cell would result in an energy savings in the RAN (e.g., whether the increase in energy consumption by the macro cell radio m is less than the energy consumption of small cell radio i), as shown by the constraint (b) $h_m(\rho_m + \Delta\rho_{m \leftarrow (i)'}) - h_m(\rho_m) < E_{(i)'}$. At STEP 2.1.1.1, if (b) is true, then the set S can be updated to include the union of the current set of small cell radios to further include small cell radio i and the procedure can proceed to STEP 3. [Note it should be understood that for the index i=1 the current set of small cell radios will be empty.] At STEP 2.1.1.2, if (b) is false, then the procedure can proceed to STEP 3.

At STEP 3, the index i can be incremented and at STEP 3.1, the procedure can check whether the index i is greater than the number of small cell radios within the coverage area of the macro cell radio, as shown by constraint (c): i≤$N_m$. At STEP 3.1.1, if (c) is true, the procedure can return to STEP 2 to repeat the (a) and (b) checks for the next small cell radio i+1. At STEP 3.1.2, if (c) is false, the procedure can return the set of small cell radios belonging to the set S and the procedure can end. Following completion of the procedure, UE handovers can be initiated for the UE connected to the small cell radios belonging to the set S and, once the UE have been handed over to the macro cell radio m, the small cell radios can be powered off.

Accordingly, in various embodiments, communication system 100 can provide a method to determine a maximum energy savings for a RAN by solving an optimization problem characterizing energy savings or energy consumption based on one or more potential UE handovers subject to certain load constraints.

Figure 5:
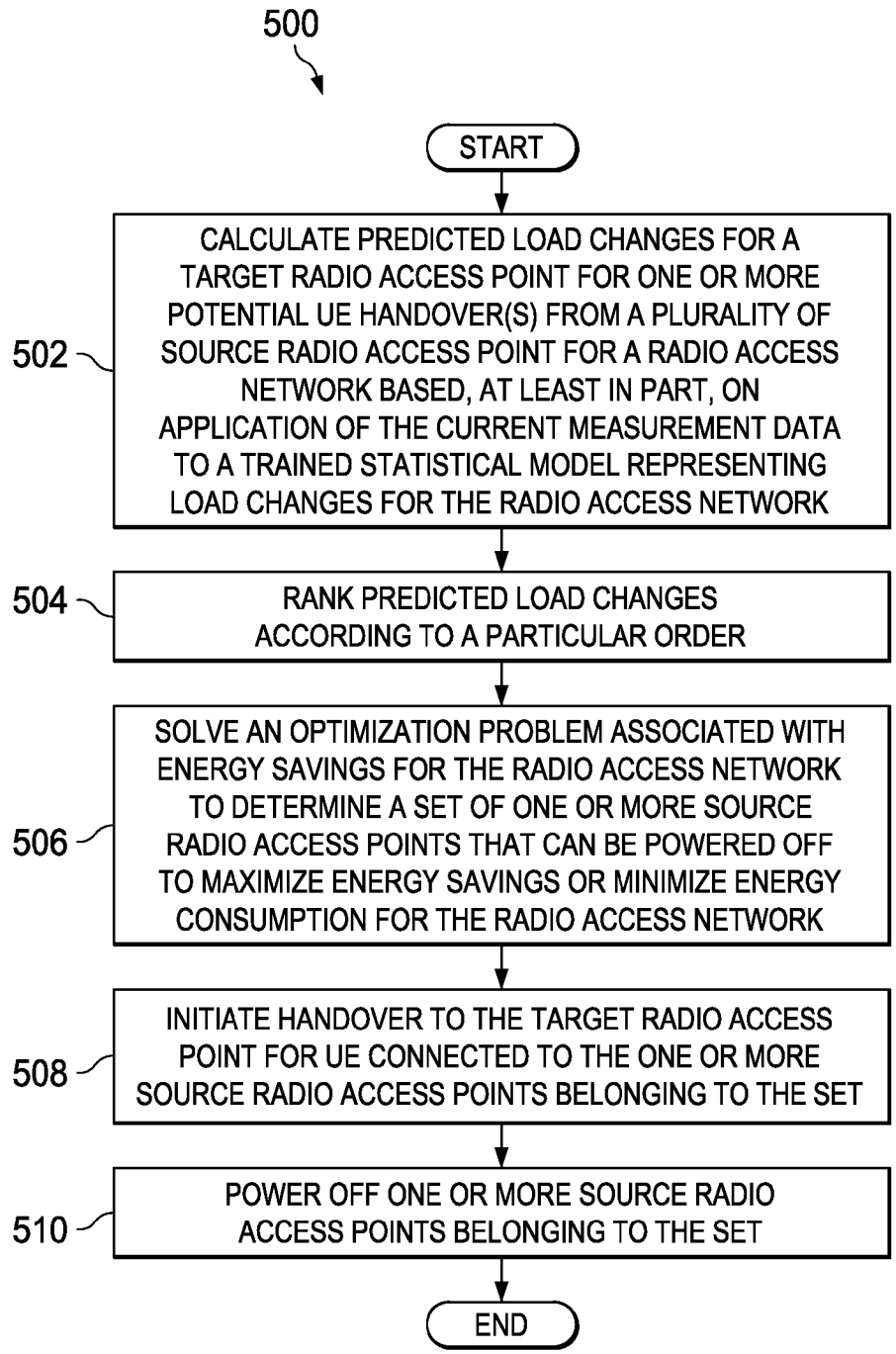
FIG. 5 is a simplified flow diagram illustrating example operations associated with determining a maximum energy savings for a radio access network in accordance with one potential embodiment of the communication system.

Turning to FIG. 5, FIG. 5 is a simplified flow diagram illustrating example operations 500 associated determining a maximum energy savings for a RAN (e.g., RAN 116 or 416) in accordance with one potential embodiment of communication system 100. In various embodiments, operations 500 can assume that a given statistical model for predicting loads or load changes for one or more potential UE handovers has been sufficiently trained and/or re-trained as discussed for the various embodiments described herein and that a determination has been made that a prediction for a load change is needed.

At 502, the operations can include calculating predicted load changes for a target radio access point for one or more potential UE handover(s) from a plurality of source radio access point for a radio access network based, at least in part, on application of the current measurement data to a trained statistical model representing load changes for the radio access network. In some embodiments, the trained statistical model can be a multiple regression model associated with one or more load function (e.g., model) that relates measurement data collected for the radio access network to load changes for UE handovers within the radio access network. In various embodiments, each of the source radio access points may provide a corresponding coverage area that is contained within a corresponding coverage area of the target radio access point.

At 504, the operations can include ranking each of the predicted load changes for the one or more potential UE handovers calculated for each of the plurality of source radio access points in a predetermined order. In some embodiments, the predetermined order can be an ascending order representing a range of predicted load changes for the target radio access point that ranges from a smallest contribution of predicted load change for the target radio access point for one or more potential UE handovers from a particular source radio access point to a largest contribution of predicted load change for the target radio access point for one or more potential UE handovers from another particular source radio access point. In some embodiments, the ranking at 504 can include ranking energy consumption for the source radio access points for the predicted load changes in a descending order ranging from the source radio access point having the largest contribution to energy consumption for the RAN to the source radio access point having the smallest contribution to energy consumption for the RAN.

At 506, the operations can include solving an optimization problem associated with energy savings for the radio access network in order to determine a set of one or more source radio access points that can be powered off to maximize energy savings or minimize energy consumption for the radio access network. In various embodiments, the optimization problem can be constrained based on a maximum allowable load that the target radio access point can support. In various embodiments, operations 502, 504 and 506 can be performed via data analytics engine 126 and/or one or more nodes of central management system 118 via various exchanges, which can include, at least in part, exchanges of measurement data collected by the one or more nodes of central management system 118.

Upon determining the set of one or more source radio access points that can be powered off, the operations can include initiating handover to the target radio access point for UE connected to the source radio access points belonging to the set at 508. In various embodiments, handover can be initiated via one or more command messages that may be generated via one or more nodes of central management system 118 (e.g., any of RRM system 130, SON management system 132, small cell management system and/or WLC 136).

At 510, the operations can include powering off one or more source radio access points belong to the set and the operations may end. In various embodiments, the powering off can be initiated via one or more command messages that may be generated via one or more nodes of central management system 118. It should be understood that, in various embodiments as discussed herein, that operations 500 can be repeated at various times, time periods, etc. in order to update the energy savings, loading, etc. for the radio access network in order to optimize efficient use of resources within communication system 100.

Figure 6A:
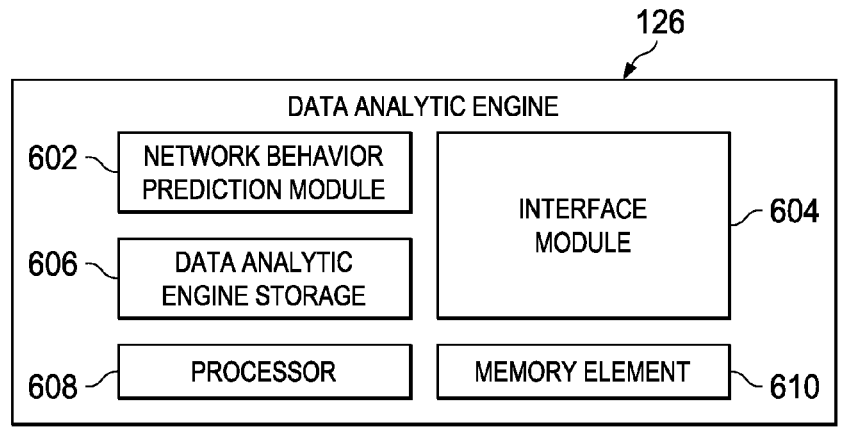
FIGS. 6A-6E are simplified block diagrams illustrating additional details associated with various potential embodiments of the communication system.
Figure 6B:
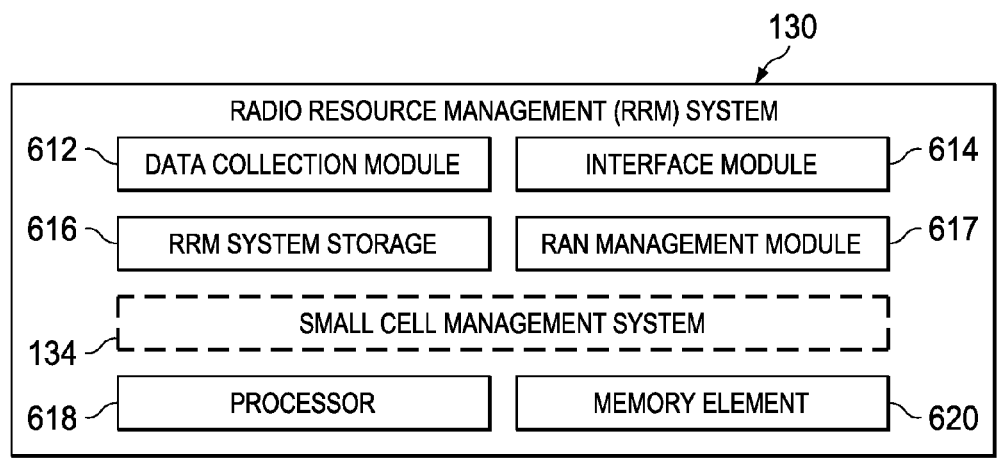
Figure 6C:
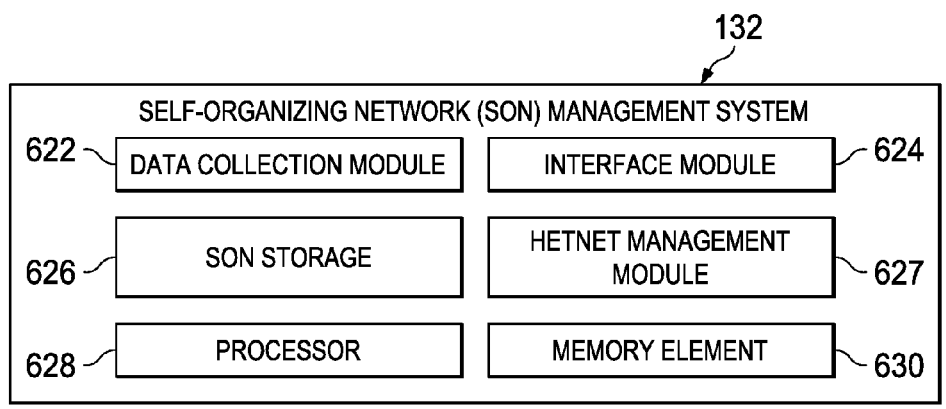
Figure 6D:
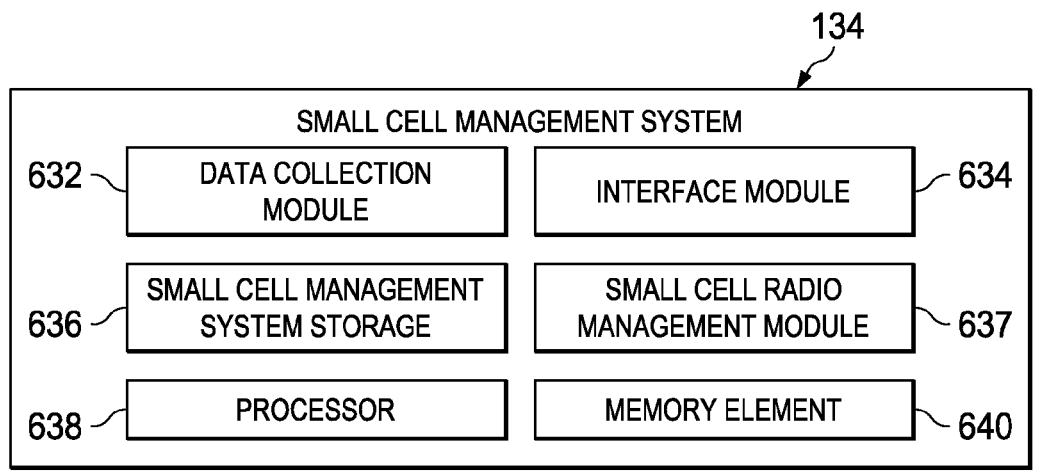
Figure 6E:
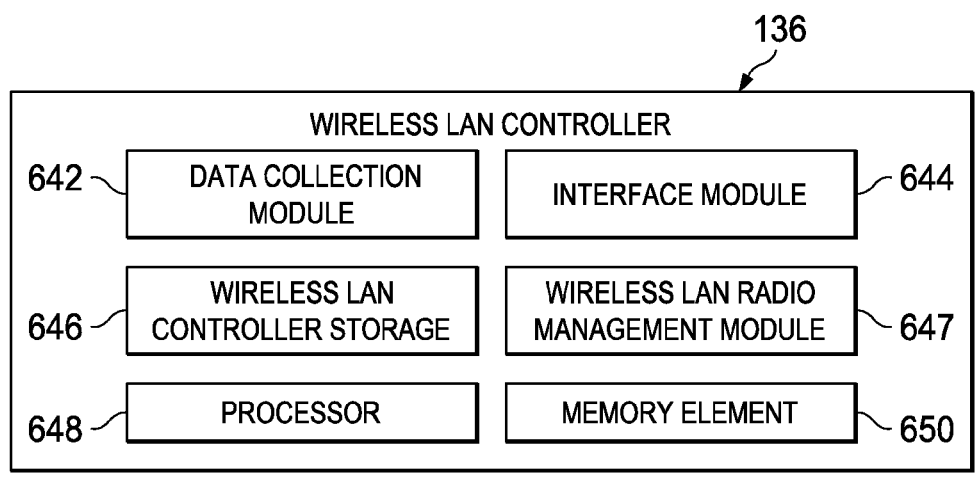

Turning to FIGS. 6A-6E, FIGS. 6A-6E are simplified block diagrams illustrating example details of various elements that can be associated with communication system 100 in accordance with one or more embodiments. FIG. 6A is a simplified block diagram illustrating example details that can be associated with data analytics engine 126 in accordance with one embodiment of communication system 100. FIG. 6B is a simplified block diagram illustrating example details that can be associated with radio resource management (RRM) system 130 in accordance with one embodiment of communication system 100. FIG. 6C is a simplified block diagram illustrating example details that can be associated with Self-Organizing Network (SON) management system 132 in accordance with one embodiment of communication system 100. FIG. 6D is a simplified block diagram illustrating example details that can be associated with small cell management system 134 in accordance with one embodiment of communication system 100. FIG. 6E is a simplified block diagram illustrating example details that can be associated with wireless LAN controller 136 in accordance with one embodiment of communication system 100.

Referring to FIG. 6A, data analytic engine 126 can include a network behavior prediction module 602, an interface module 604, a data analytic engine storage 606, at least one processor 608 and at least one memory element 610. In at least one embodiment, at least one processor 608 is at least one hardware processor configured to execute various tasks, operations and/or functions of data analytic engine 126 as described herein and at least one memory element 610 is configured to store data and/or information associated with data analytic engine 126. In various embodiments, network behavior prediction module 602, can be configured to implement various network behavior prediction operations as described herein, including, but not limited to, training or re-training (e.g., updating) a statistical model that relates one or more network behaviors (e.g., loads, load changes, congestion, etc.) based on one or more input parameters (e.g., measurement data) gathered from a radio access network (e.g., RAN 116, RAN 416, etc.); formulating network behavior definitions, models, functions, etc. that can be used across one or more statistical models; solving various optimization problems based on the predicted network behaviors (e.g., apply the predicted behaviors to one or more other operations in order to control and/or manage resources for communication system 100; ranking predicted behavior results; and/or other operations as described herein.

In various embodiments, interface module 604 can be configured to implement one or more operations associated with interfacing with one or more nodes, systems, etc. of communication system 100 in order to exchange data and/or information, which may be used to facilitate one or more data analysis operations (e.g., network behavior prediction operations) of data analytic engine 126 and/or may be used to communicate the results of one or more data analysis operations to central management system 118 (e.g., any of RRM system 130, SON management system 132, small cell management system and/or WLC 136, etc.). In various embodiments, the interfacing may be performed via one or more communication protocols, application programming interface (API) procedure calls, handshaking operations, combinations thereof or the like to exchange data and/or information as discussed herein.

In various embodiments, data analytic engine storage 606 can be configured to store information associated with various operations as described herein including, but not limited to, storing one or more predicted behavior results (e.g., loads or load changes) for one or more potential UE handovers among one or more radio access points; storing ranked orders of predicted behavior results; storing sets of radio access points that can be powered off; storing measurement data; combinations thereof or storing any other data or information associated with various operations as described herein.

Referring to FIG. 6B, RRM system 130 can include a data collection module 612, an interface module 614, a RRM system storage 616, a RAN management module 617, at least one processor 618 and at least one memory element 620. In at least one embodiment, at least one processor 618 is at least one hardware processor configured to execute various tasks, operations and/or functions of RRM system 130 as described herein and at least one memory element 620 is configured to store data and/or information associated with RRM system 130. In some embodiments, small cell management system 134 can be included within RRM system 130.

In various embodiments, data collection module 612, can be configured to implement various data collection operations as described herein, including, but not limited to, collecting measurement data from a given RAN (e.g., RAN 116, RAN 416) before and after one or more UE handovers within the RAN; collecting user data associated with one or more UE in the RAN from service provider network 120 (e.g., via one or more subscriber data repositories such as, for example, Authentication, Authorization and Accounting (AAA) elements, a Home Subscriber Server/Home Location Register (HSS/HLR), etc. as prescribed by 3GPP standards); and/or other operations as described herein. In various embodiments, user data can include QoS information, bit rate information, etc. for one or more user services provided to UE within the RAN.

In various embodiments, interface module 614 can be configured to implement one or more operations associated with interfacing with one or more nodes, systems, etc. of communication system 100 in order to exchange data and/or information, which may be used to facilitate one or more data analysis operations (e.g., network behavior prediction operations) of data analytic engine 126; may be used to communicate the results of one or more data analysis operations to RRM system 130; may be used to collect data measurements from one or more radio access points of a given RAN; may be used to exchange communications with service provider network 120; and/or may be used to communicate one or more management and/or control commands to one or more radio access points of the RAN. In various embodiments, the interfacing may be performed via one or more communication protocols, application programming interface (API) procedure calls, handshaking operations, combinations thereof or the like to exchange data and/or information as discussed herein.

In various embodiments, RRM system storage 616 can be configured to store information associated with various operations as described herein including, but not limited to, storing one or more predicted behavior results (e.g., loads or load changes) for one or more potential UE handovers among one or more radio access points; storing ranked orders of predicted behavior results; storing sets of radio access points that can be powered off; storing measurement data; combinations thereof or storing any other data or information associated with various operations as described herein.

In various embodiments, RAN management module 617 can be configured to implement one or more operations as discussed herein for controlling and/or managing operation of a given RAN (e.g., RAN 116, RAN 416, etc.), including, but not limited to, initiating one or more UE handovers within the RAN, powering off one or more radio access points within the RAN, managing UE admission control, combinations thereof or the like.

Referring to FIG. 6C, SON management system 132 can include a data collection module 622, an interface module 624, a SON storage 626, a Heterogeneous Network (HetNet) management module 627, at least one processor 628 and at least one memory element 630. In at least one embodiment, at least one processor 628 is at least one hardware processor configured to execute various tasks, operations and/or functions of SON management system 132 as described herein and at least one memory element 630 is configured to store data and/or information associated with SON management system 132. In various embodiments, data collection module 622, can be configured to implement various data collection operations as described herein, including, but not limited to, collecting measurement data from a given RAN (e.g., RAN 116, RAN 416) before and after one or more UE handovers within the RAN; collecting user data associated with one or more UE in the RAN from service provider network 120 (e.g., via one or more subscriber data repositories such as, for example, AAA elements, a HSS/HLR, etc. as prescribed by 3GPP standards); and/or other operations as described herein.

In various embodiments, interface module 624 can be configured to implement one or more operations associated with interfacing with one or more nodes, systems, etc. of communication system 100 in order to exchange data and/or information, which may be used to facilitate one or more data analysis operations (e.g., network behavior prediction operations) of data analytic engine 126; may be used to communicate the results of one or more data analysis operations to SON management system 132; may be used to collect data measurements from one or more radio access points of a given RAN; may be used to exchange communications with service provider network 120; and/or may be used to communicate one or more management and/or control commands to one or more radio access points of the RAN. In various embodiments, the interfacing may be performed via one or more communication protocols, application programming interface (API) procedure calls, handshaking operations, combinations thereof or the like to exchange data and/or information as discussed herein.

In various embodiments, SON storage 626 can be configured to store information associated with various operations as described herein including, but not limited to, storing one or more predicted behavior results (e.g., loads or load changes) for one or more potential UE handovers among one or more radio access points; storing ranked orders of predicted behavior results; storing sets of radio access points that can be powered off; storing measurement data; combinations thereof or storing any other data or information associated with various operations as described herein.

In various embodiments, HetNet management module 627 can be configured to implement one or more operations as discussed herein for controlling and/or managing operation of a given RAN (e.g., RAN 116, RAN 416, etc.), including, but not limited to, initiating one or more UE handovers within the RAN, powering off one or more radio access points within the RAN, load balancing among radio access points within the RAN, managing UE admission control, combinations thereof or the like. In various embodiments, HetNet management module 627 may be configured to implement operations as discussed herein for controlling and/or managing operation among different layers of a given RAN such as, for example, a macro cell layer of macro cell radios, a small cell layer of small cell radios and/or a WLAN layer of WLAN radio access points.

Referring to FIG. 6D, small cell management system 134 can include a data collection module 632, an interface module 634, a small cell management system storage 636, a small cell radio management module 637, at least one processor 638 and at least one memory element 640. In at least one embodiment, at least one processor 638 is at least one hardware processor configured to execute various tasks, operations and/or functions of small cell management system 134 as described herein and at least one memory element 640 is configured to store data and/or information associated with small cell management system 134. In various embodiments, data collection module 632, can be configured to implement various data collection operations as described herein, including, but not limited to, collecting measurement data from a given RAN (e.g., RAN 116, RAN 416) before and after one or more UE handovers for one or more small cell radios of the RAN; collecting user data associated with one or more UE connected to one or more small cell radios in the RAN from service provider network 120 (e.g., via one or more subscriber data repositories such as, for example, AAA elements, a HSS/HLR, etc. as prescribed by 3GPP standards); and/or other operations as described herein.

In various embodiments, interface module 634 can be configured to implement one or more operations associated with interfacing with one or more nodes, systems, etc. of communication system 100 in order to exchange data and/or information, which may be used to facilitate one or more data analysis operations (e.g., network behavior prediction operations) of data analytic engine 126; may be used to communicate the results of one or more data analysis operations to small cell management system 134; may be used to collect data measurements from one or more small cell radios of a given RAN; may be used to exchange communications with service provider network 120; and/or may be used to communicate one or more management and/or control commands to one or more small cell radios of the RAN. In various embodiments, the interfacing may be performed via one or more communication protocols, application programming interface (API) procedure calls, handshaking operations, combinations thereof or the like to exchange data and/or information as discussed herein.

In various embodiments, small cell management system storage 636 can be configured to store information associated with various operations as described herein including, but not limited to, storing one or more predicted behavior results (e.g., loads or load changes) for one or more potential UE handovers among one or more small cell radios; storing ranked orders of predicted behavior results; storing sets of small cell radios that can be powered off; storing measurement data; combinations thereof or storing any other data or information associated with various operations as described herein.

In various embodiments, small cell radio management module 637 can be configured to implement one or more operations as discussed herein for controlling and/or managing operation of a given RAN (e.g., RAN 116, RAN 416, etc.), including, but not limited to, initiating one or more UE handovers within the RAN, powering off one or more small cell radios within the RAN, load balancing among small cell radios within the RAN, managing UE admission control, combinations thereof or the like. In various embodiments, small cell radio management module 637 may be configured to implement operations for configuring one or more small cell radios according to a given communication protocol and data model.

Referring to FIG. 6E, wireless LAN controller 136 can include a data collection module 642, an interface module 644, a wireless LAN controller storage 646, a wireless LAN radio management module 647, at least one processor 648 and at least one memory element 650. In at least one embodiment, at least one processor 648 is at least one hardware processor configured to execute various tasks, operations and/or functions of wireless LAN controller 136 as described herein and at least one memory element 650 is configured to store data and/or information associated with wireless LAN controller 136. In various embodiments, data collection module 642, can be configured to implement various data collection operations as described herein, including, but not limited to, collecting measurement data from a given RAN (e.g., RAN 116, RAN 416) before and after one or more UE handovers for one or more WLAN radio access points of the RAN; collecting user data associated with one or more UE connected to one or more WLAN radio access points in the RAN from service provider network 120 (e.g., via one or more subscriber information repositories); and/or other operations as described herein.

In various embodiments, interface module 644 can be configured to implement one or more operations associated with interfacing with one or more nodes, systems, etc. of communication system 100 in order to exchange data and/or information, which may be used to facilitate one or more data analysis operations (e.g., network behavior prediction operations) of data analytic engine 126; may be used to communicate the results of one or more data analysis operations to wireless LAN controller 136; may be used to collect data measurements from one or more WLAN radio access points of a given RAN; may be used to exchange communications with service provider network 120; and/or may be used to communicate one or more management and/or control commands to one or more WLAN radio access points of the RAN. In various embodiments, the interfacing may be performed via one or more communication protocols, application programming interface (API) procedure calls, handshaking operations, combinations thereof or the like to exchange data and/or information as discussed herein.

In various embodiments, wireless LAN controller storage 646 can be configured to store information associated with various operations as described herein including, but not limited to, storing one or more predicted behavior results (e.g., loads or load changes) for one or more potential UE handovers among one or more WLAN radio access points; storing ranked orders of predicted behavior results; storing sets of WLAN radio access points that can be powered off; storing measurement data; combinations thereof or storing any other data or information associated with various operations as described herein.

In various embodiments, wireless LAN radio management module 647 can be configured to implement one or more operations as discussed herein for controlling and/or managing operation of a given RAN (e.g., RAN 116, RAN 416, etc.), including, but not limited to, initiating one or more UE handovers within the RAN, powering off one or more WLAN radio access points within the RAN, load balancing among WLAN radio access points within the RAN, managing UE admission control, combinations thereof or the like. In various embodiments, small cell management system 134 may be configured to implement operations for configuring one or more WLAN radio access points according to a given communication protocol and data model.

In regards to the internal structure associated with communication system 100, each of UE 112a-112e and UE 112m-112w, radio access points 114a-114c, small cell radios 414a-414c and macro cell radio 418 (as shown in FIG. 4) may each also include a respective processor, a respective memory element; a respective storage; and one or more transmitters, receivers and/or antennas to facilitate over-the-air communications.

Hence, appropriate software, hardware and/or algorithms are being provisioned in UE 112a-112e, UE 112-112w, radio access points 114a-114c, service provider network 120, data analysis system 122 including data analytic engine 126, central management system 118 including one or more of RRM system 130, SON management system 132, small cell management system 134 and/or wireless LAN controller 136 as well as small cell radios 414a-414c and macro cell radio 418 (as shown in FIG. 4) in order to facilitate network behavior prediction (e.g., loads or load changes), RAN optimization and/or RAN management/control operations as described for various embodiments discussed herein. Note that in certain embodiments, certain databases can be consolidated with memory elements (or vice versa), or the storage can overlap/exist in any other suitable manner.

In one example implementation, UE 112a-112e, UE 112-112w, radio access points 114a-114c, service provider network 120, data analysis system 122 including data analytic engine 126, central management system 118 including one or more of RRM system 130, SON management system 132, small cell management system 134 and/or wireless LAN controller 136 as well as small cell radios 414a-414c and macro cell radio 418 (as shown in FIG. 4) are network elements, which are meant to encompass network appliances, servers, routers, switches, gateways, bridges, loadbalancers, firewalls, processors, modules, or any other suitable device, component, element, or object operable to exchange information that facilitates or otherwise helps coordinate network behavior prediction (e.g., loads or load changes), RAN optimization and/or RAN management/control activities as discussed herein (e.g., for networks such as those illustrated in FIG. 1 and FIG. 4). In other embodiments, these operations and/or features may be provided external to these elements, or included in some other network device to achieve this intended functionality. Alternatively, one or more of these elements can include software (or reciprocating software) that can coordinate in order to achieve the operations and/or features, as outlined herein. In still other embodiments, one or more of these devices may include any suitable algorithms, hardware, software, components, modules, interfaces, or objects that facilitate the operations thereof. This may be inclusive of appropriate algorithms and communication protocols that allow for the effective exchange of data and/or information.

In various embodiments, UE 112a-112e, UE 112-112w, radio access points 114a-114c, service provider network 120, data analysis system 122 including data analytic engine 126, central management system 118 including one or more of RRM system 130, SON management system 132, small cell management system 134 and/or wireless LAN controller 136 as well as small cell radios 414a-414c and macro cell radio 418 (as shown in FIG. 4) may keep information in any suitable memory element [e.g., random access memory (RAM), read only memory (ROM), an erasable programmable read only memory (EPROM), application specific integrated circuit (ASIC), etc.], software, hardware, or in any other suitable component, device, element, or object where appropriate and based on particular needs. Any of the memory items discussed herein should be construed as being encompassed within the broad term 'memory element'. Information being tracked or sent to UE 112a-112e, UE 112-112w, radio access points 114a-114c, service provider network 120, data analysis system 122 including data analytic engine 126, central management system 118 including one or more of RRM system 130, SON management system 132, small cell management system 134 and/or wireless LAN controller 136 as well as small cell radios 414a-414c and macro cell radio 418 (as shown in FIG. 4) could be provided in any database, register, control list, cache, or storage structure: all of which can be referenced at any suitable timeframe. Any such storage options may be included within the broad term 'memory element' as used herein. Similarly, any of the potential processing elements, modules, and machines described herein should be construed as being encompassed within the broad term 'processor'. Each of the network elements and/or user equipment can also include suitable interfaces for receiving, transmitting, and/or otherwise communicating data and/or information in a network environment.

Note that in certain example implementations, the network behavior prediction (e.g., loads or load changes), RAN optimization and/or RAN management/control functions as outlined herein may be implemented by logic encoded in one or more tangible media, which may be inclusive of non-transitory media (e.g., embedded logic provided in an ASIC, in digital signal processing (DSP) instructions, software [potentially inclusive of object code and source code] to be executed by a processor, or other similar machine, etc.). In some of these instances, memory elements [as shown in FIGS. 6A-6E] can store data used for the operations described herein. This includes the memory elements being able to store software, logic, code, or processor instructions that are executed to carry out the activities described herein. A processor (e.g., a hardware processor) can execute any type of instructions associated with the data to achieve the operations detailed herein. In one example, the processors [as shown in FIGS. 6A-6E] could transform an element or an article (e.g., data, information) from one state or thing to another state or thing. In another example, the activities outlined herein may be implemented with fixed logic or programmable logic (e.g., software/computer instructions executed by a processor) and the elements identified herein could be some type of a programmable processor, programmable digital logic (e.g., a field programmable gate array (FPGA), a DSP processor, an EPROM, an electrically erasable PROM (EEPROM) or an ASIC that includes digital logic, software, code, electronic instructions, or any suitable combination thereof.

Note that in this Specification, references to various features (e.g., elements, structures, modules, components, steps, operations, characteristics, etc.) included in 'one embodiment', 'example embodiment', 'an embodiment', 'another embodiment', 'certain embodiments', 'some embodiments', 'various embodiments', 'other embodiments', 'alternative embodiment', and the like are intended to mean that any such features are included in one or more embodiments of the present disclosure, but may or may not necessarily be combined in the same embodiments. Note also that a module or engine as referred to herein this Specification, can be inclusive of an executable file comprising instructions that can be understood and processed on a computer, and may further include library modules or engines loaded during execution, object files, system files, hardware logic, software logic, or any other executable modules or engines.

It is also important to note that the operations and steps described with reference to the preceding FIGURES illustrate only some of the possible scenarios that may be executed by, or within, the system. Some of these operations may be deleted or removed where appropriate, or these steps may be modified or changed considerably without departing from the scope of the discussed concepts. In addition, the timing of these operations may be altered considerably and still achieve the results taught in this disclosure. The preceding operational flows have been offered for purposes of example and discussion. Substantial flexibility is provided by the system in that any suitable arrangements, chronologies, configurations, and timing mechanisms may be provided without departing from the teachings of the discussed concepts.

Note that with the examples provided above, as well as numerous other examples provided herein, interaction may be described in terms of one, two, three, or four network elements. However, this has been done for purposes of clarity and example only. In certain cases, it may be easier to describe one or more of the functionalities by only referencing a limited number of network elements. It should be appreciated that communication system 100 (and its teachings) are readily scalable and can accommodate a large number of components, as well as more complicated/sophisticated arrangements and configurations. Accordingly, the examples provided should not limit the scope or inhibit the broad teachings of communication system 100 as potentially applied to a myriad of other architectures.

Although the present disclosure has been described in detail with reference to particular arrangements and configurations, these example configurations and arrangements may be changed significantly without departing from the scope of the present disclosure. For example, although the present disclosure has been described with reference to particular communication exchanges involving certain network access and protocols, communication system 100 may be applicable to other exchanges or routing protocols. Moreover, although communication system 100 has been illustrated with reference to particular elements and operations that facilitate the communication process, these elements, and operations may be replaced by any suitable architecture or process that achieves the intended functionality of communication system 100.

Numerous other changes, substitutions, variations, alterations, and modifications may be ascertained to one skilled in the art and it is intended that the present disclosure encompass all such changes, substitutions, variations, alterations, and modifications as falling within the scope of the appended claims. In order to assist the United States Patent and Trademark Office (USPTO) and, additionally, any readers of any patent issued on this application in interpreting the claims appended hereto, Applicant wishes to note that the Applicant: (a) does not intend any of the appended claims to invoke paragraph six (6) of 35 U.S.C. section 112 as it exists on the date of the filing hereof unless the words "means for" or "step for" are specifically used in the particular claims; and (b) does not intend, by any statement in the specification, to limit this disclosure in any way that is not otherwise reflected in the appended claims.

What is claimed is:

1. A method comprising:
   calculating predicted load changes for a target radio access point for one or more potential user equipment (UE) handovers from each of a plurality of source radio access points for a radio access network based, at least in part, on application of current measurement data to a trained statistical model representing load changes for the radio access network;

determining a set of one or more source radio access points that can be powered off to maximize energy savings or minimize energy consumption for the radio access network;

initiating handover to the target radio access point for one or more UE connected to the one or more source radio access points belonging to the set; and powering off the one or more source radio access points belonging to the set.

2. The method of claim 1, wherein the statistical model is associated with a load function representing load or load changes for the plurality of radio access points.

3. The method of claim 1, further comprising:
ranking each predicted load change for the target radio access point for the one or more potential UE handovers calculated for each of the plurality of source radio access points according to a predetermined order.

4. The method of claim 3, wherein the predetermined order of the ranking represents one of:
a range of predicted load changes from a smallest contribution of predicted load change for the target radio access point to a largest predicted load change for the target radio access point; and
a range of energy consumption for the plurality of source radio access points for the predicted load changes in a descending order from a largest contribution to energy consumption within the radio access network for a given source radio access point to a smallest contribution to energy consumption within the radio access network.

5. The method of claim 1, wherein each of the plurality of source radio access points provides a corresponding coverage area that is contained within a coverage area of the target radio access point.

6. The method of claim 1, wherein handover of the one or more UE is initiated by one of:
a radio resource management system;
a self-organizing network management system;
a small cell management system; and
a wireless local area network (WLAN) controller.

7. The method of claim 1, wherein determining the set of one or more source radio access points that can be powered off includes solving an optimization problem to determine a maximized energy savings that can be achieved by powering off a number of source radio access points in relation to a load constraint associated with the target radio access point.

8. The method of claim 1, wherein determining the set of one or more source radio access points that can be powered off includes solving an optimization problem to determine a minimized energy consumption that can be achieved by powering off a number of source radio access points in relation to a load constraint associated with the target radio access point and an increase in power consumption by the target radio access point that is realized upon powering of each of the number of source radio access points.

9. One or more non-transitory tangible media encoding logic that includes instructions for execution that when executed by a processor, is operable to perform operations comprising:
calculating predicted load changes for a target radio access point for one or more potential user equipment (UE) handovers from each of a plurality of source radio access points for a radio access network based, at least in part, on application of current measurement data to a trained statistical model representing load changes for the radio access network;

determining a set of one or more source radio access points that can be powered off to maximize energy savings or minimize energy consumption for the radio access network;

initiating handover to the target radio access point for one or more UE connected to the one or more source radio access points belonging to the set; and powering off the one or more source radio access points belonging to the set.

10. The media of claim 9, wherein the statistical model is associated with a load function representing load or load changes for the plurality of radio access points.

11. The media of claim 9, further comprising:
ranking each predicted load change for the target radio access point for the one or more potential UE handovers calculated for each of the plurality of source radio access points according to a predetermined order.

12. The media of claim 11, wherein the predetermined order of the ranking represents one of:
a range of predicted load changes from a smallest contribution of predicted load change for the target radio access point to a largest predicted load change for the target radio access point; and
a range of energy consumption for the plurality of source radio access points for the predicted load changes in a descending order from a largest contribution to energy consumption within the radio access network for a given source radio access point to a smallest contribution to energy consumption within the radio access network.

13. The media of claim 9, wherein each of the plurality of source radio access points provides a corresponding coverage area that is contained within a coverage area of the target radio access point.

14. The media of claim 9, wherein determining the set of one or more source radio access points that can be powered off includes solving an optimization problem to determine a maximized energy savings that can be achieved by powering off a number of source radio access points in relation to a load constraint associated with the target radio access point.

15. The media of claim 9, wherein determining the set of one or more source radio access points that can be powered off includes solving an optimization problem to determine a minimized energy consumption that can be achieved by powering off a number of source radio access points in relation to a load constraint associated with the target radio access point and an increase in power consumption by the target radio access point that is realized upon powering of each of the number of source radio access points.

16. A communication system comprising:
a data analytic engine comprising at least one first memory element for storing first data and at least one first processor that executes instructions associated with the first data;
a central management system comprising at least one second memory element for storing second data and at least one second processor that executes instructions associated with the second data;
the data analytic engine being adapted when executed by the at least one first processor to:
calculate predicted load changes for a target radio access point for one or more potential user equipment (UE) handovers from each of a plurality of source radio access points for a radio access network based, at least in part, on application of current measurement data to a trained statistical model representing load changes for the radio access network; and determine a set of one or more source radio access points that can be powered off to maximize energy savings or minimize energy consumption for the radio access network;

the central management system being adapted when executed by the at least one second processor to:

initiate handover to the target radio access point for one or more UE connected to the one or more source radio access points belonging to the set; and power off the one or more source radio access points belonging to the set.

17. The communication system of claim 16, wherein the data analytic engine is further adapted when executed by the at least one first processor to:

rank each predicted load change for the target radio access point for the one or more potential UE handovers calculated for each of the plurality of source radio access points according to a predetermined order.

18. The communication system of claim 17, wherein the predetermined order of the ranking represents one of:

a range of predicted load changes from a smallest contribution of predicted load change for the target radio access point to a largest predicted load change for the target radio access point; and a range of energy consumption for the plurality of source radio access points for the predicted load changes in a descending order from a largest contribution to energy consumption within the radio access network for a given source radio access point to a smallest contribution to energy consumption within the radio access network.

19. The communication system of claim 16, wherein determining the set of one or more source radio access points that can be powered off includes solving an optimization problem to determine a maximized energy savings that can be achieved by powering off a number of source radio access points in relation to a load constraint associated with the target radio access point.

20. The communication system of claim 16, wherein determining the set of one or more source radio access points that can be powered off includes solving an optimization problem to determine a minimized energy consumption that can be achieved by powering off a number of source radio access points in relation to a load constraint associated with the target radio access point and an increase in power consumption by the target radio access point that is realized upon powering of each of the number of source radio access points.

* * * * *